US011732137B2

United States Patent
Al et al.

(10) Patent No.: US 11,732,137 B2
(45) Date of Patent: Aug. 22, 2023

(54) COLOR RESIST MATERIAL, FILTER, AND PREPARATION METHOD THEREOF

(71) Applicant: TCL CHINA STAR OPTOELECTRONICS TECHNOLOGY CO., LTD., Shenzhen (CN)

(72) Inventors: Lin Al, Shenzhen (CN); Hsiaohsien Chen, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 310 days.

(21) Appl. No.: 16/768,672

(22) PCT Filed: Apr. 8, 2020

(86) PCT No.: PCT/CN2020/083740
§ 371 (c)(1),
(2) Date: May 31, 2020

(87) PCT Pub. No.: WO2021/189530
PCT Pub. Date: Sep. 30, 2021

(65) Prior Publication Data
US 2022/0119643 A1    Apr. 21, 2022

(30) Foreign Application Priority Data
Mar. 24, 2020  (CN) .......................... 202010212980.7

(51) Int. Cl.
*C09B 69/10* (2006.01)
*C09B 47/08* (2006.01)
*C09B 47/18* (2006.01)
*G02B 1/04* (2006.01)

(52) U.S. Cl.
CPC .......... *C09B 69/108* (2013.01); *C09B 47/085* (2013.01); *C09B 47/18* (2013.01); *G02B 1/04* (2013.01); *G02F 2202/04* (2013.01); *G02F 2203/01* (2013.01)

(58) Field of Classification Search
CPC .......... C09B 47/085; C09B 47/18; G02B 1/04
See application file for complete search history.

(56) References Cited

U.S. PATENT DOCUMENTS

2009/0085017 A1   4/2009  Nemoto
2015/0087741 A1   3/2015  Li

FOREIGN PATENT DOCUMENTS

| CN | 101204885 A | 6/2008 |
| CN | 105017504 A | 11/2015 |
| CN | 107814806 A | 3/2018 |
| CN | 108003172 A | 5/2018 |
| CN | 109991308 A | 7/2019 |
| JP | H0381331 A | 4/1991 |
| JP | 2011219644 A | 11/2011 |
| WO | 2012051337 A2 | 4/2012 |

OTHER PUBLICATIONS

Luo. Tetrahedron Letters, 2004, 7737-7740 (Year: 2004).*
Duncan McCallien and Jeremy Sanders. Journal of the American Chemical Society, 1995, 117, 6611-6612.

* cited by examiner

*Primary Examiner* — Noble E Jarrell
(74) *Attorney, Agent, or Firm* — PV IP PC; Wei Te Chung; Zhigang Ma

(57) ABSTRACT

The present application discloses a color resist material, a filter, and a preparation method thereof. The color resist material is a trimer structure formed by polymerizing phthalocyanine dyes, wherein groups with double bonds are introduced on the phthalocyanine dyes to construct a three-molecule complex by a complexing agent, and the phthalocyanine dyes are connected by the double bonds to form a trimer structure. The color resist material with the trimer structure is stably stored in a photoresist liquid and has excellent solvent resistance, while maintains good solubility. Accordingly, a filter made of the color resist material has high transmittance and good optical performance.

20 Claims, No Drawings

COLOR RESIST MATERIAL, FILTER, AND PREPARATION METHOD THEREOF

BACKGROUND OF INVENTION

Field of Invention

The present application relates to a field of display, and specifically relates to a color resist material, a filter, and a preparation method thereof.

Description of Prior Art

At present, the development of high-definition large screens in the display field has gradually increased the requirements for transmittance properties. A color filter is one of the layers that restricts the transmittance properties. A color resist material is a key material in the preparation of color filter, and continuously developed. Color resist materials are usually dye-based color resist materials, which often have stability problems in manufacturing processes, such as solvent resistance, which is not as mature as pigment particles, and higher solubility of the dye leads to poor solvent resistance.

SUMMARY OF INVENTION

In order to solve the problems in the prior art, the present application provides a color resist material with high solubility and solvent resistance stability, a filter, and a preparation method thereof.

The present application provides a color resist material, having a chemical structure represented by Formula (1):

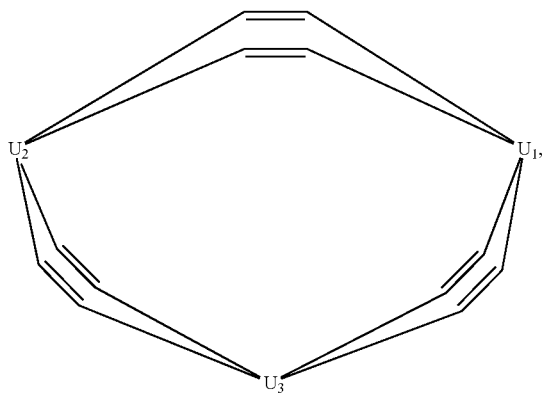

(1)

wherein each of chemical structures U1, U2 and U3 is represented by Formula (1-2):

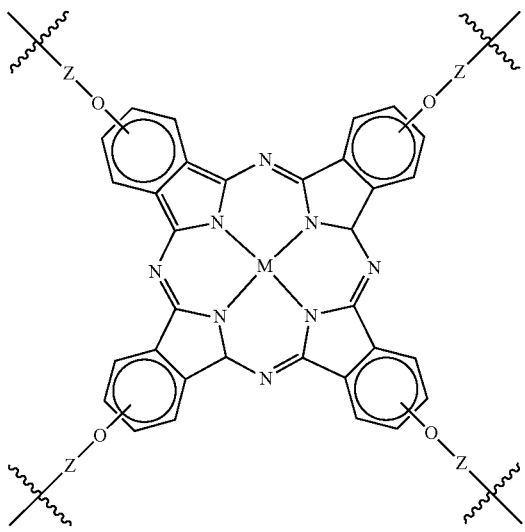

(1-2)

wherein Z has an end connected to oxygen and another end connected to a double bond in Formula (1), Z is selected from alkylene and —YOX—, where X is selected from alkylene, and Y is selected from arylene, and wherein in Formula (1), a benzene ring is also connected with other functional groups, each of the other functional groups is independently selected from one of hydrogen, halogen, alkyl, alkoxy, aryl, aryloxy, and a heterocyclic group, and M represents a metal or a metal halide.

In some embodiments, U1 has a chemical structure represented by Formula (2) or (3), U2 has a chemical structure represented by Formula (4) or (5), and U3 has a chemical structure represented by Formula (6) or (7):

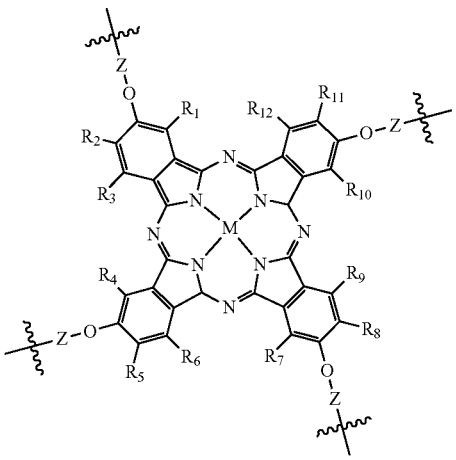

(2)

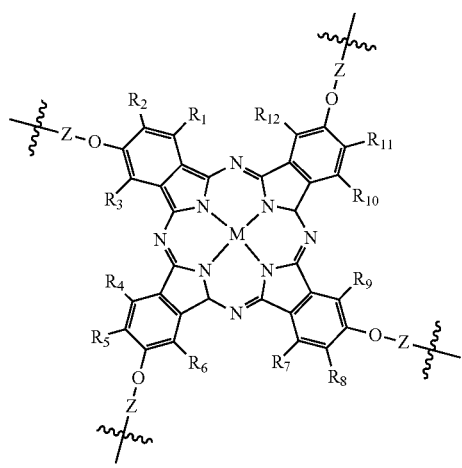

(3)

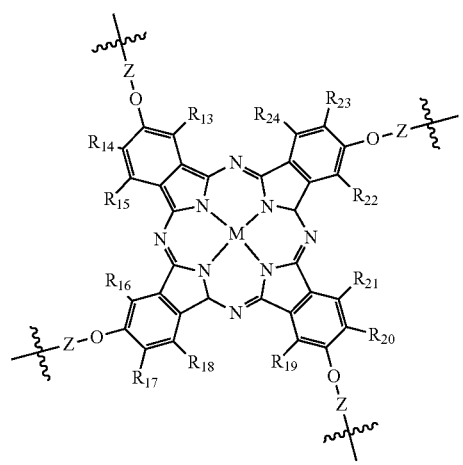

(4)

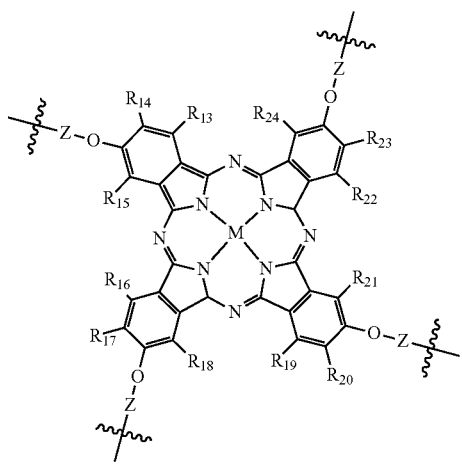

(5)

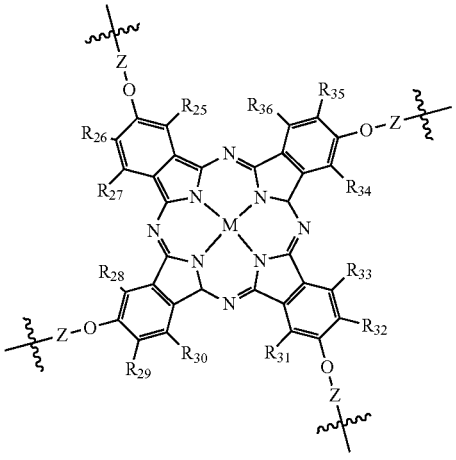

(6)

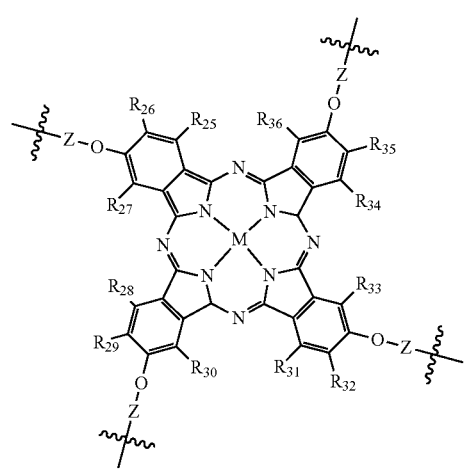

(7)

wherein each of R1 to R36 is independently selected from one of hydrogen, halogen, alkyl, alkoxy, aryl, aryloxy, and a heterocyclic group.

In some embodiments, Z is selected from one of alkylene having 2 to 8 carbons and —YOX—, where X is selected from alkylene having 1 to 3 carbons, and Y is selected from arylene having 12 to 24 carbons.

In some embodiments, the arylene is a substituted or unsubstituted phenylene, naphthylene, or biphenylene.

In some embodiments, the arylene contains —O—R as a substituent, and R is selected from one of the following groups:

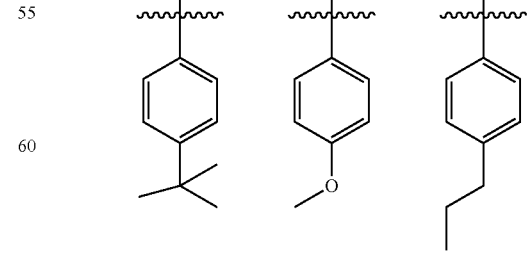

In some embodiments, each of the other functional groups is independently selected from one of halogen, alkyl having 1 to 8 carbons, alkoxy having 1 to 8 carbons, aryl having 6 to 12 carbons, aryloxy having 6 to 12 carbons, and a heterocyclic group having 3 to 12 carbons.

In some embodiments, at least four of $R_1$, $R_3$, $R_4$, $R_6$, $R_7$, $R_9$, $R_{10}$, $R_{12}$, at least four of $R_{13}$, $R_{15}$, $R_{16}$, $R_{18}$, $R_{19}$, $R_{21}$, $R_{22}$, $R_{24}$, and at least four of $R_{25}$, $R_{27}$, $R_{28}$, $R_{30}$, $R_{31}$, $R_{33}$, $R_{34}$, $R_{36}$ are selected from halogen, alkyl having 1 to 8 carbons, alkoxy having 1 to 8 carbons, aryl having 6 to 12 carbons, aryloxy having 6 to 12 carbons, and heterocyclic groups having 3 to 12 carbons.

The present application also provides a filter, including at least one of the color resist materials.

The present application also provides a method of preparing a color resist material, including the following steps:

dissolving a phthalocyanine dye represented by one of Formula (8), Formula (9), and Formula (10) in a first solvent;

adding tripyridyltriazine to the first solvent, followed by stirring and then standing still to obtain a phthalocyanine complex having a chemical structure of Formula (11);

dissolving the phthalocyanine complex in a second solvent, and adding a catalyst to the second solvent for reaction;

performing quenching, extraction, and separation and purification by column chromatography, to obtain a phthalocyanine trimer of chemical structure (12); and eluting the phthalocyanine trimer to obtain the color resist material having a chemical structure represented by Formula (1):

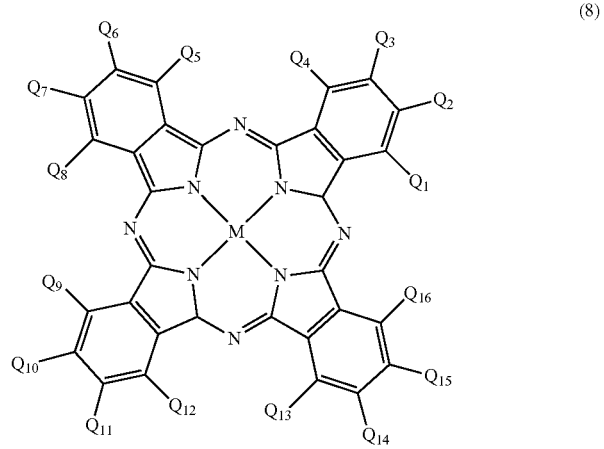

(8)

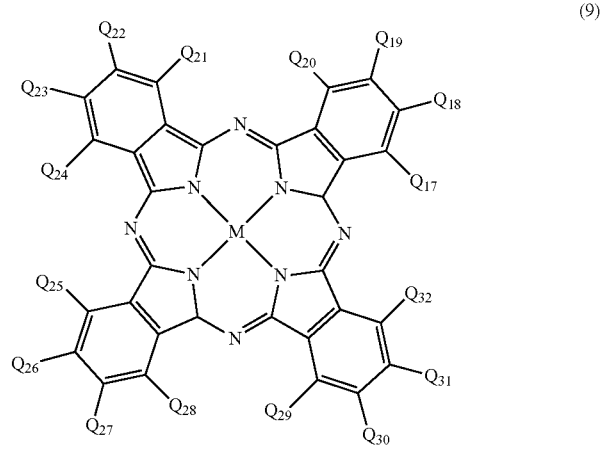

(9)

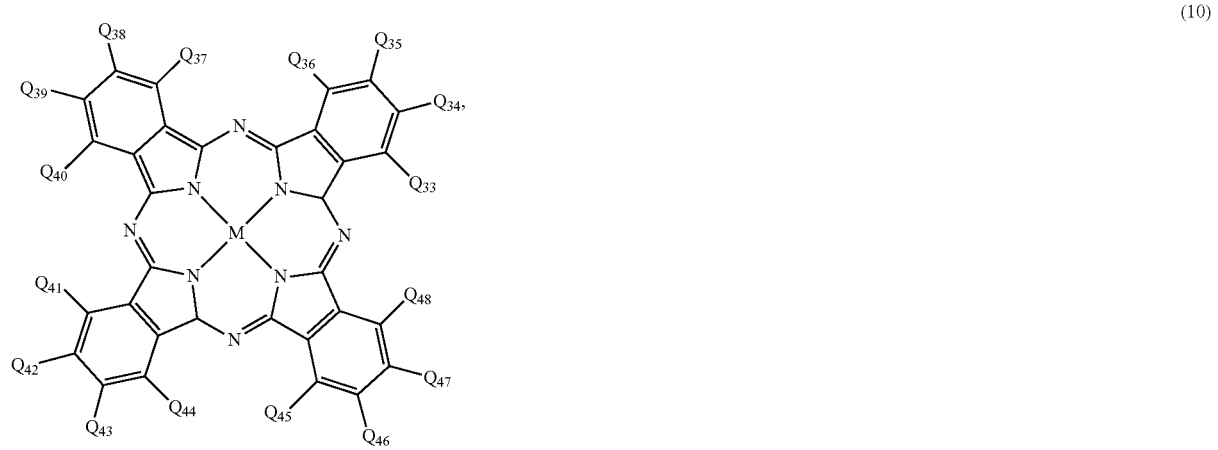

(10)

-continued

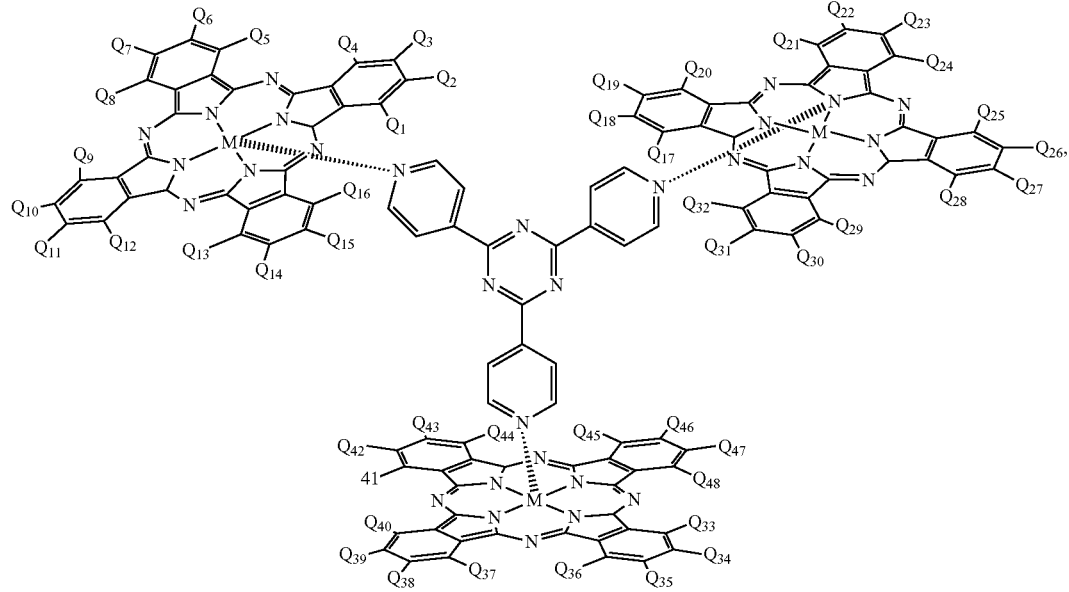

(11)

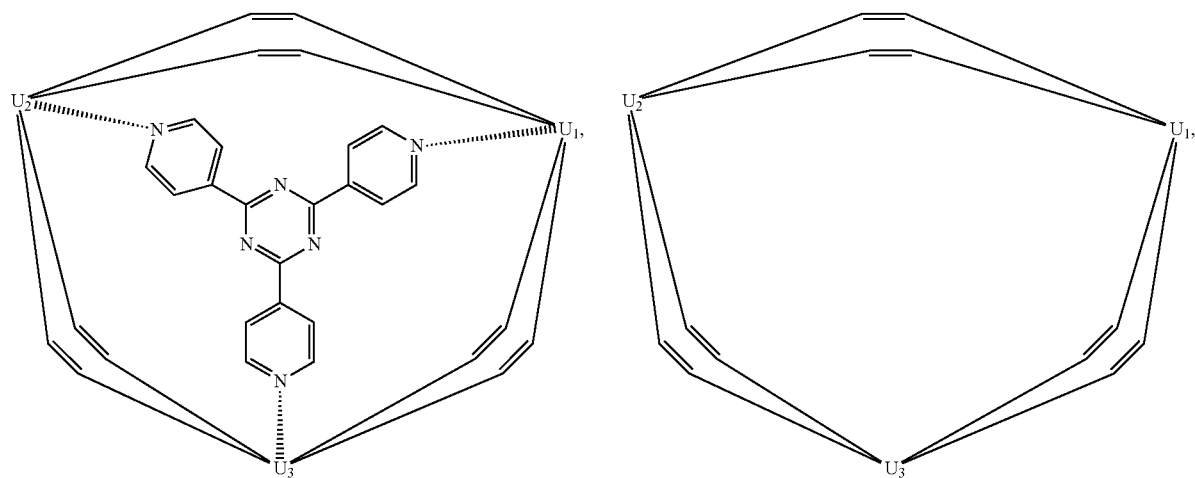

(12)                                                                                   (1)

wherein one of $Q_1$ to $Q_4$, one of $Q_5$ to $Q_8$, one of $Q_9$ to $Q_{12}$, one of $Q_{13}$ to $Q_{16}$, one of $Q_{17}$ to $Q_{20}$, one of $Q_{21}$ to $Q_{24}$, one of $Q_{25}$ to $Q_{28}$, one of $Q_{29}$ to $Q_{32}$, one of $Q_{33}$ to $Q_{36}$, one of $Q_{37}$ to $Q_{40}$, one of $Q_{41}$ to $Q_{44}$, and one of $Q_{45}$ to $Q_{48}$ are selected from —O—Z—CH=CH$_2$, where Z is selected from one of alkylene and —YOX—, in which X is selected from alkylene, and Y is selected from arylene; each of other functional groups in Q1 to Q48 is independently selected from one of hydrogen, halogen, alkyl, alkoxy, aryl, aryloxy, and a heterocyclic group; and wherein M is selected from a metal or a metal halide.

In some embodiments, the preparation method further comprises a step of preparing the phthalocyanine dye represented by one of Formula (8), Formula (9), and Formula (10).

Compared with the prior art, the present application has the beneficial effects and advantages as follows:

The present application provides a color resist material with a trimer molecular structure, which can be stably dispersed in a photoresist liquid, and has excellent solvent resistance and heat resistance, while maintains good solubility. Accordingly, a filter made of the color resist material has high transmittance and good optical performance, thereby improve the LCD display quality.

DETAILED DESCRIPTION OF PREFERRED EMBODIMENTS

First, the definition and clarification of terms are proposed, followed by exemplary embodiments of the present application to enable those skilled in the art to understand and implement the present application. However, the present application can be implemented in many variations and should not be interpreted as being limited to the described embodiments.

An exemplary embodiment of the present application provides a color resist material, having a chemical structure represented by Formula (1):

(1)

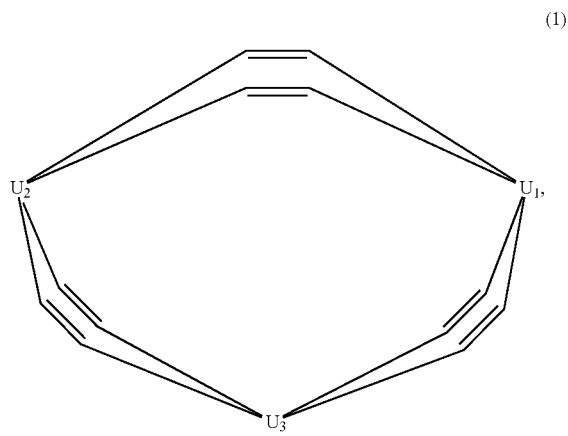

wherein each of chemical structures U1, U2 and U3 is represented by Formula (1-2):

(1-2)

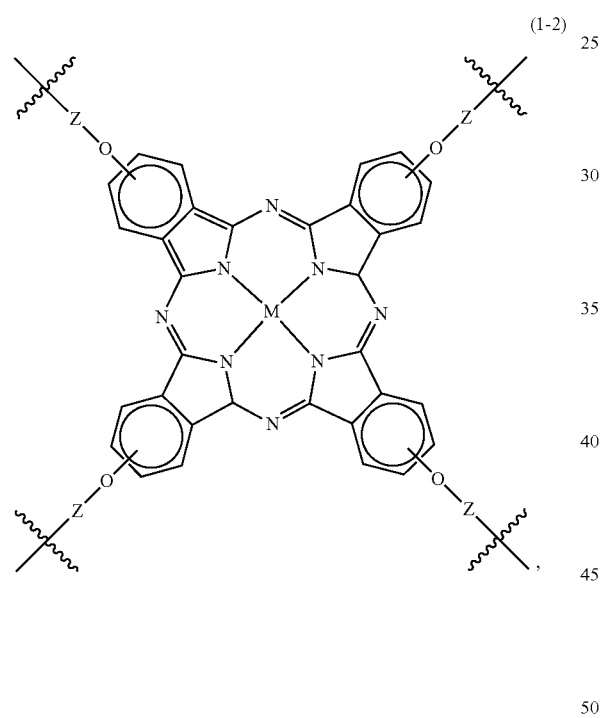

wherein Z has an end connected to oxygen and another end connected to a double bond in Formula (1), Z is selected from alkylene and —YOX—, where X is selected from alkylene, and Y is selected from arylene; and wherein in Formula (1), a benzene ring is also connected with other functional groups, each of the other functional groups is independently selected from one of hydrogen, halogen, alkyl, alkoxy, aryl, aryloxy, and a heterocyclic group, and M represents a metal or a metal halide, which includes $Zn^{2+}$, $Cu^{2+}$, $Ni^{2+}$, $Co^{2+}$, $Fe^{2+}$, $AlCl^{2+}$, or $SiCl_2^{2+}$.

In some embodiments, U1 has a chemical structure represented by Formula (2) or (3), U2 has a chemical structure represented by Formula (4) or (5), and U3 has a chemical structure represented by Formula (6) or (7):

(2)

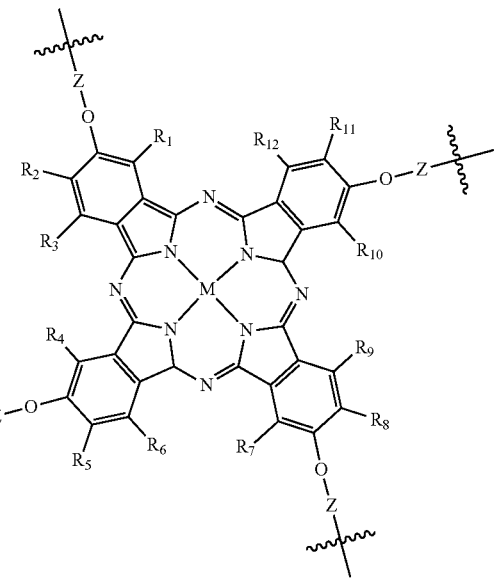

(3)

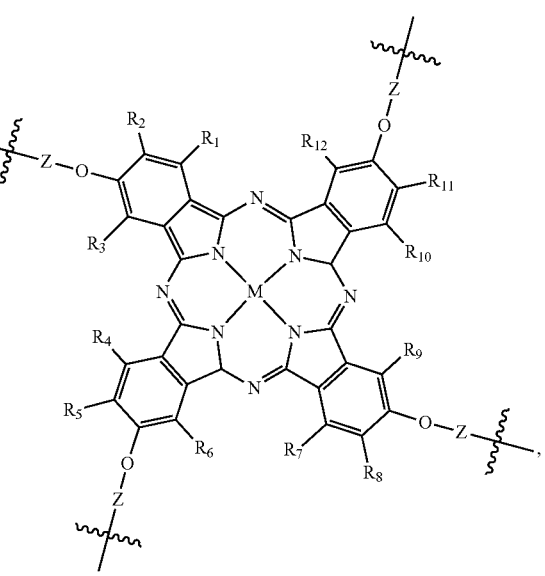

(4)

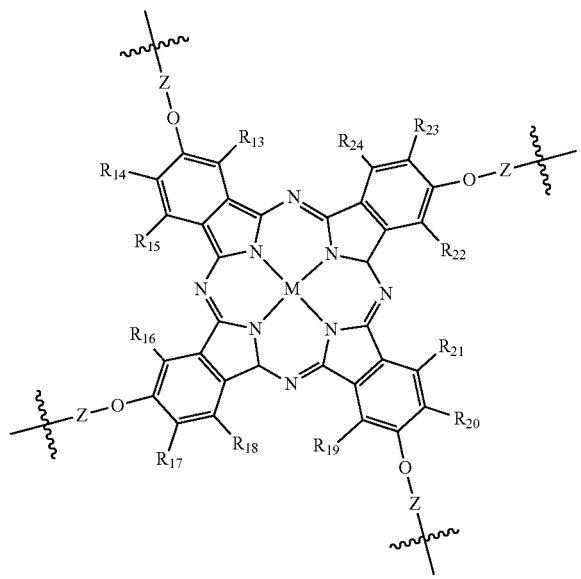

(5)

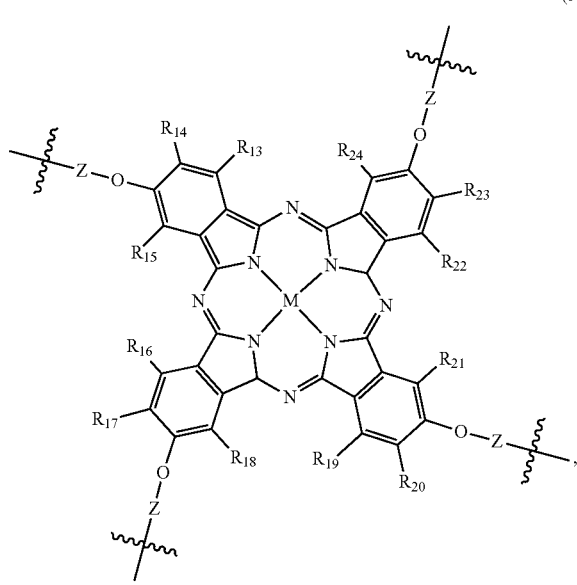

(6)

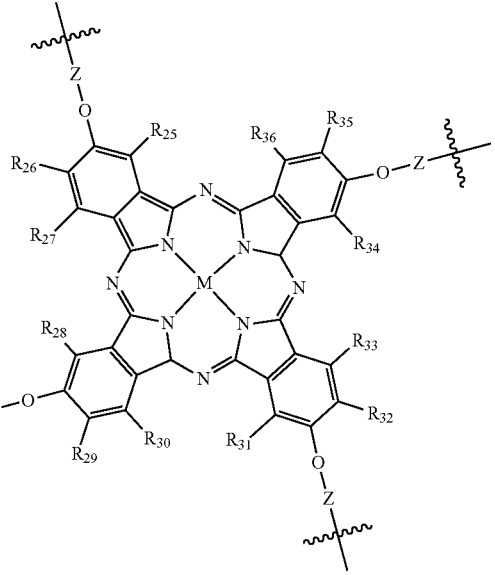

(7)

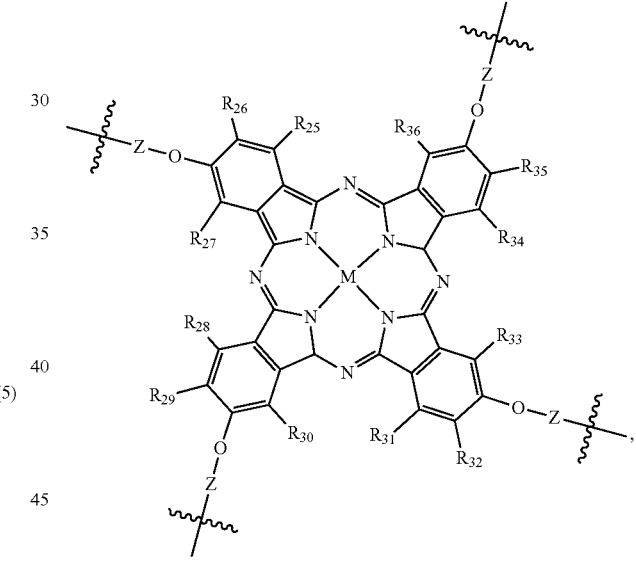

wherein each of $R_1$ to $R_{36}$ is independently selected from one of hydrogen, halogen, alkyl, alkoxy, aryl, aryloxy, and a heterocyclic group.

In some embodiments, Z is selected from alkylene having 2 to 8 carbon atoms. The alkylene having 2 to 8 carbon atoms may be a linear, branched or cyclic alkylene having 2 to 8 carbon atoms. Each of these groups have a large steric hindrance, thus preventing the phthalocyanine dyes in the trimer structure from aggregating.

In some embodiments, Z is selected from —Y—O—X—, where X is selected from alkylene having 1 to 3 carbon atoms, and may be methylene, ethylene, and propylene. Y is selected from arylene having 12 to 24 carbon atoms. The arylene may be substituted or unsubstituted phenylene, naphthylene, or biphenylene. If heat resistance is considered, Y is preferably a substituted or unsubstituted phenylene, and in view of solubility, more preferably a phenoxy-substituted phenylene, the phenoxy-substituted phenylene has a chemical structure represented by Formula (11),

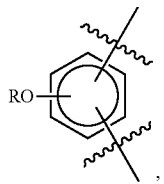
(11)

Z includes one of the following 10 structures,

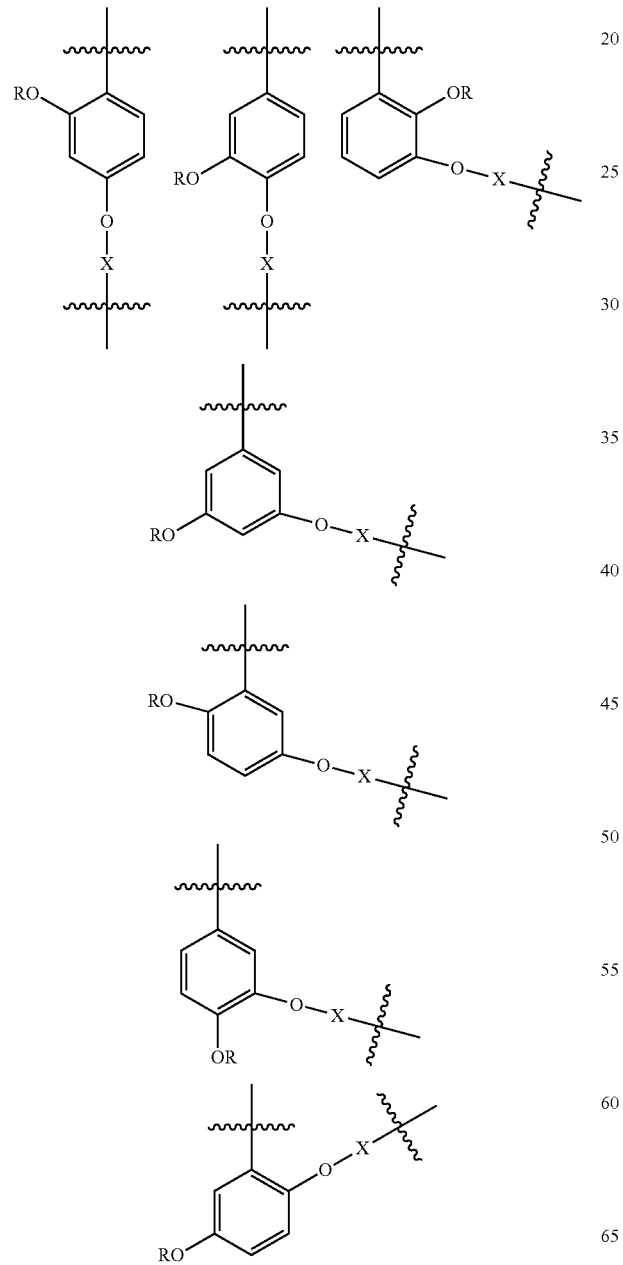

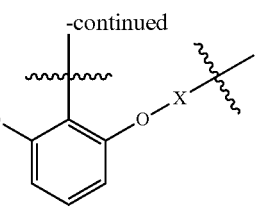

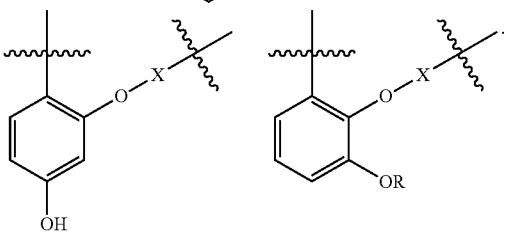

R may be a group with a large steric hindrance, specifically, selected from one of the following groups:

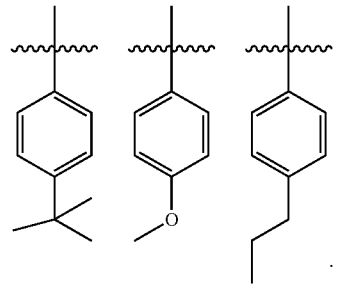

In some embodiments, each of the other functional groups is independently selected from one of halogen, alkyl having 1 to 8 carbons, alkoxy having 1 to 8 carbons, aryl having 6 to 12 carbons, aryloxy having 6 to 12 carbons, and a heterocyclic group having 3 to 12 carbons. In addition, when a bonding site, that is an alpha position of each of $R_1$, $R_3$, $R_4$, $R_6$, $R_7$, $R_9$, $R_{10}$, $R_{12}$, $R_{13}$, $R_{15}$, $R_{16}$, $R_{18}$, $R_{19}$, $R_{21}$, $R_{22}$, $R_{24}$, $R_{25}$, $R_{27}$, $R_{28}$, $R_{30}$, $R_{31}$, $R_{33}$, $R_{34}$, $R_{36}$, is connected to a substituent, the solubility of the dye-based color resist material is more excellent, and by selecting an appropriate number of substituents can realize a balance between the solvent resistance stability and solubility of the color resist material. In the trimer structure in the present application, at least four of $R_1$, $R_3$, $R_4$, $R_6$, $R_7$, $R_9$, $R_{10}$, $R_{12}$, at least four of $R_{13}$, $R_{15}$, $R_{16}$, $R_{18}$, $R_{19}$, $R_{21}$, $R_{22}$, $R_{24}$, and at least four of $R_{25}$, $R_{27}$, $R_{28}$, $R_{30}$, $R_{31}$, $R_{33}$, $R_{34}$, $R_{36}$ are selected from halogen, alkyl having 1 to 8 carbons, alkoxy having 1 to 8 carbons, aryl having 6 to 12 carbons, aryloxy having 6 to 12 carbons, and heterocyclic groups having 3 to 12 carbons. The halogen atom may include one of a fluorine atom, a chlorine atom, a bromine atom, and an iodine atom. The alkyl having 1 to 8 carbon atoms is not particularly limited, and may be a linear, branched or cyclic alkyl having 1 to 8 carbon atoms. Taking consideration of improving the solubility of the color resist material, in some embodiments, linear or branched alkyl having 1 to 5 carbon atoms may by employed. The alkoxy having 1 to 8 carbon atoms may include one of linear, branched, and cyclic alkoxy such as methoxy, ethoxy, propoxy, isopropoxy, butoxy, pentyloxy, hexyloxy, octyloxy. Taking consideration of increasing the solubility of the color resist material, in some embodiments, linear or branched alkoxy having 1 to 5 carbon atoms may by employed. The aryl having 6 to 12 carbon atoms may include one of phenyl, naphthyl, and phenyl; the aryloxy having 6 to 12 carbon atoms may include one of phenoxy, naphthyloxy, or biphenyloxy; and the heterocyclic group having 3 to 12 carbon atoms may include one of 2-pyrrolyl or 4-pyridyl.

Another exemplary embodiment of the present application also provides a method of preparing a color resist material, which includes the following steps: dissolving a phthalocyanine dye represented by one of Formula (8), Formula (9), and Formula (10) in a first solvent; adding tripyridyltriazine to the first solvent, followed by stirring and then standing still to obtain a phthalocyanine complex having a chemical structure of Formula (11); dissolving the phthalocyanine complex in a second solvent, and adding a catalyst to the second solvent for reaction; performing quenching, extraction, and separation and purification by column chromatography, to obtain a phthalocyanine trimer of chemical structure (12); and eluting the phthalocyanine trimer to obtain the color resist material having a chemical structure represented by Formula (1):

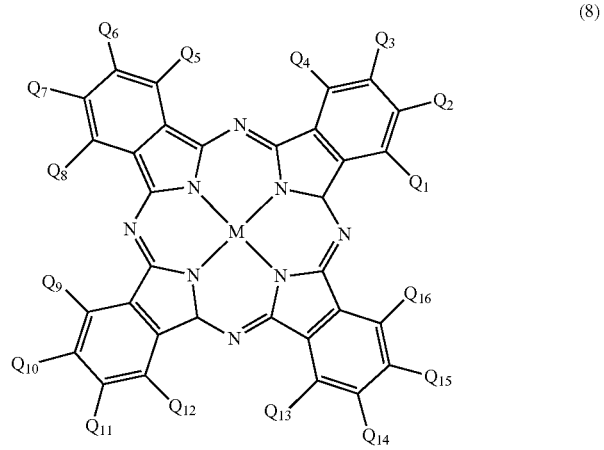

(8)

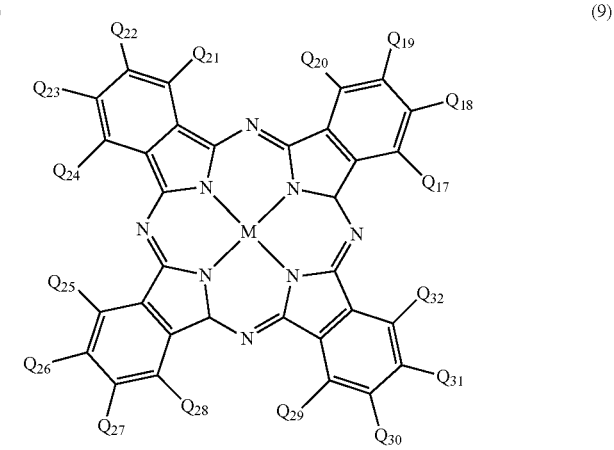

(9)

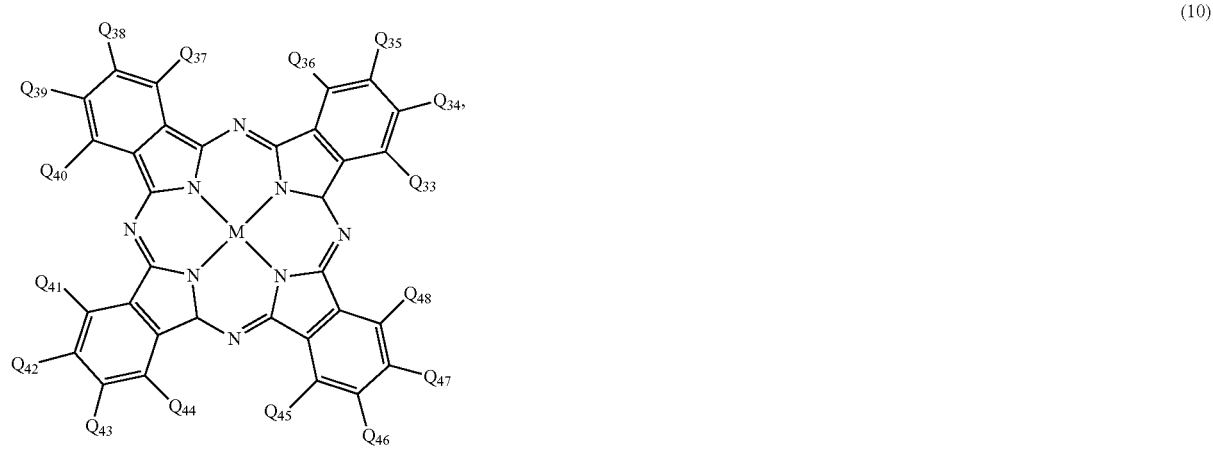

(10)

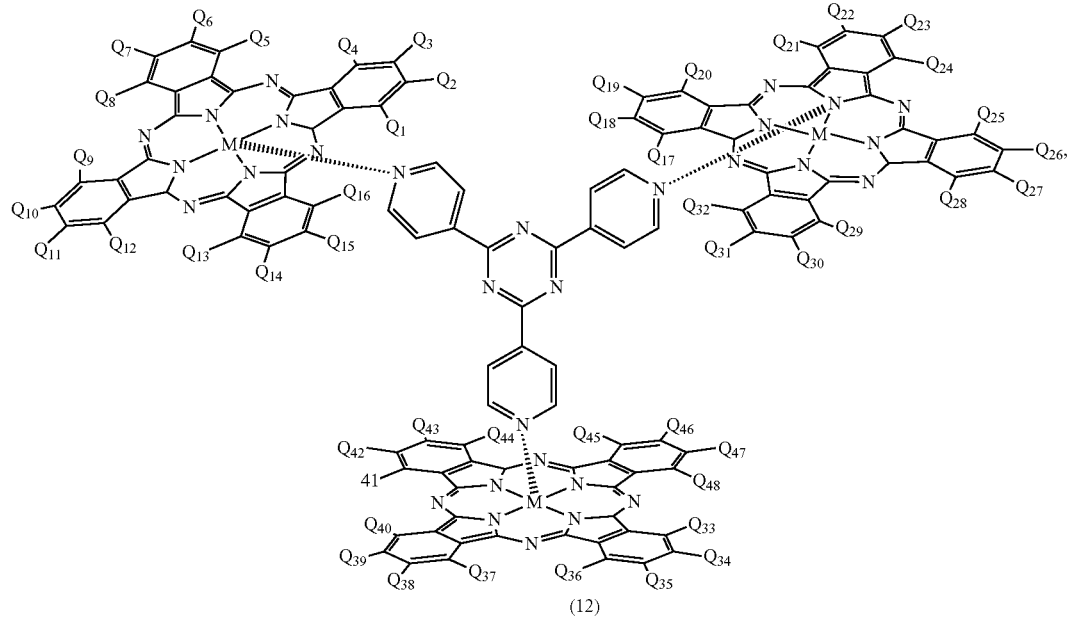

(11)

(12)    (1)

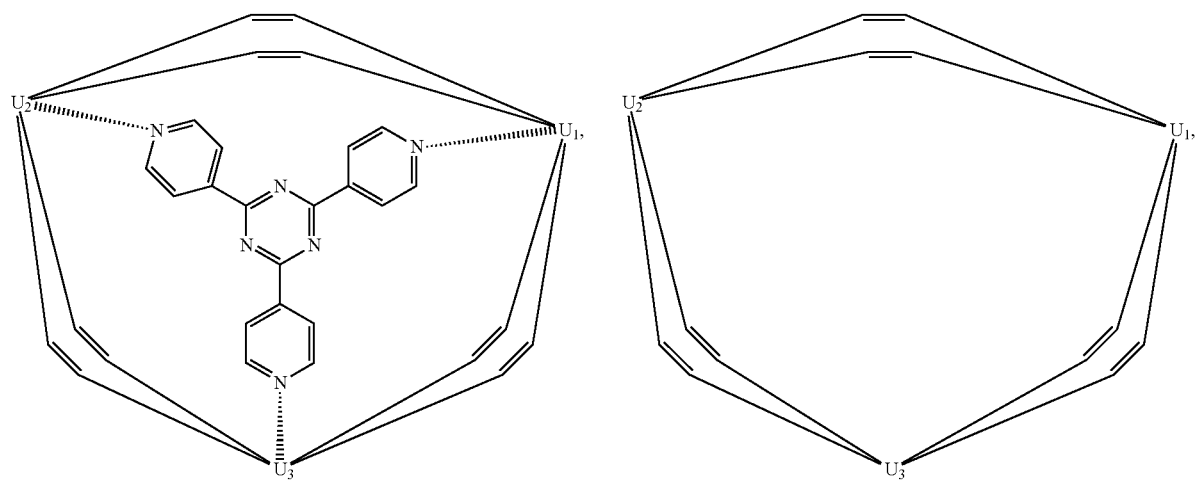

wherein one of $Q_1$ to $Q_4$, one of $Q_5$ to $Q_8$, one of $Q_9$ to $Q_{12}$, one of $Q_{13}$ to $Q_{16}$, one of $Q_{17}$ to $Q_{20}$, one of $Q_{21}$ to $Q_{24}$, one of $Q_{25}$ to $Q_{28}$, one of $Q_{29}$ to $Q_{32}$, one of $Q_{33}$ to $Q_{36}$, one of $Q_{37}$ to $Q_{40}$, one of $Q_{41}$ to $Q_{44}$, and one of $Q_{45}$ to $Q_{48}$ are selected from —O—Z—CH=CH$_2$, where Z is selected from one of alkylene and —YOX—, in which X is selected from alkylene, and Y is selected from arylene; each of other functional groups in Q1 to Q48 is independently selected from one of hydrogen, halogen, alkyl, alkoxy, aryl, aryloxy, and a heterocyclic group; and wherein M is selected from a metal or a metal halide, which specifically includes $Zn^{2+}$, $Cu^{2+}$, $Ni^{2+}$, $Co^{2+}$, $Fe^{2+}$, $AlCl^{2+}$, or $SiCl_2^{2+}$.

As an embodiment, each of $Q_2$, $Q_6$, $Q_{10}$, $Q_{14}$, $Q_{18}$, $Q_{22}$, $Q_{26}$, $Q_{30}$, $Q_{34}$, $Q_{38}$, $Q_{42}$, $Q_{46}$ is selected from —O—Z—CH=CH$_2$, where Z may have a structural formula as follows:

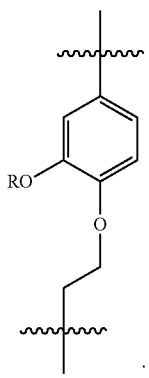

In a specific embodiment, the preparation method includes the following steps:

(1) Preparation of phthalocyanine precursor: a first reactant (0.5 mol) having a chemical structure represented by Formula (13) was added to 50 mL DMF solvent, and potassium carbonate (0.5 mol) was added, followed by stirring for 10 min to obtain a first solution. Phthalonitrile (0.7 mol) was dissolved in 50 mL DMF solvent to obtain a second solution, and the first solution was added to the second solution in batches under stirring to obtain a reaction solution. After that, stirring at room temperature for 10 min, then the reaction solution was warmed to 80° C. for heating and reaction for 5 hours, and then the reaction was stopped, followed by spin-drying, and purification by column chromatography using dichloromethane/ethyl acetate as an eluent to obtain a phthalocyanine precursor having a chemical structure represented by Formula (14).

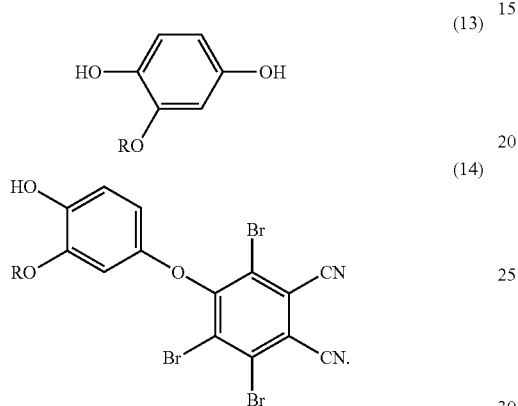

A reaction scheme of the preparation of the phthalocyanine precursor is as follows:

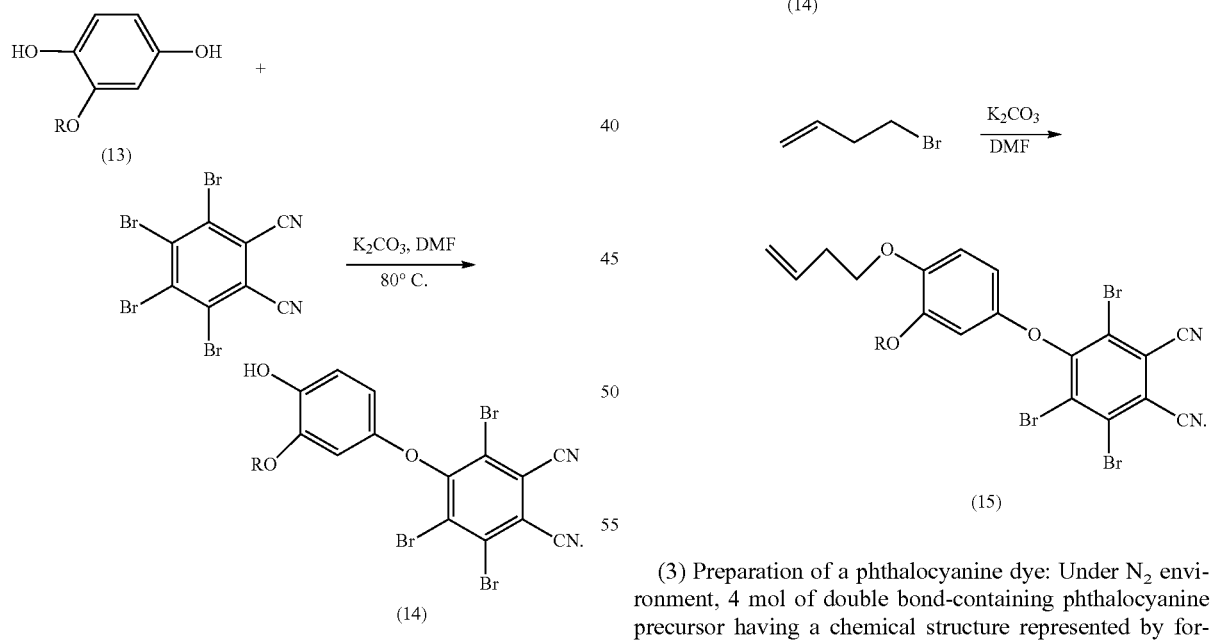

(2) Preparation of the phthalocyanine precursor containing a double bond: the phthalocyanine precursor (30 mmol) having a chemical structure represented by formula (14), potassium carbonate (45 mmol), and 4-bromo-1-butene (30 mmol) were added to 60 mL of DMF solvent, followed by stirring at 60° C. for 24 hours. After the reaction was completed, solid was filtered and washed with ethyl acetate. The washing liquid was separated and extracted by water/ethyl acetate to collect the whole organic phase, followed by washing with water and brine. After that, The organic phase was dried by anhydrous sodium sulfate, filtered, spin-dried, and purified by chromatography using petroleum ether and ethyl acetate as eluents to obtain the double bond-containing phthalocyanine precursor having a chemical structure represented by formula (15).

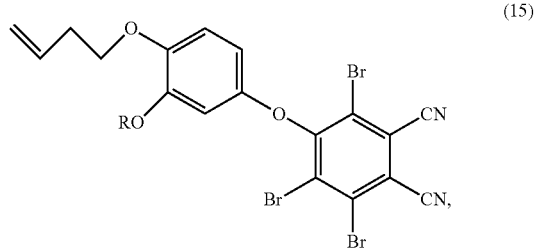

A reaction scheme in the preparation of the phthalocyanine precursor containing the double bond is as follows:

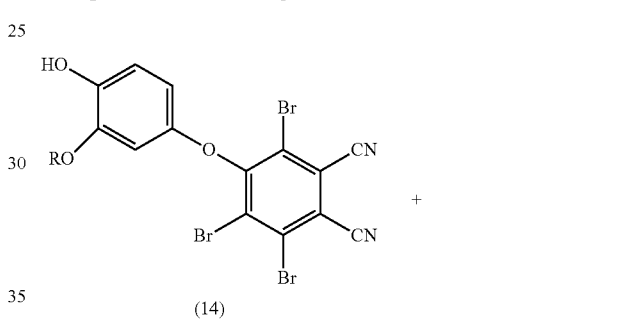

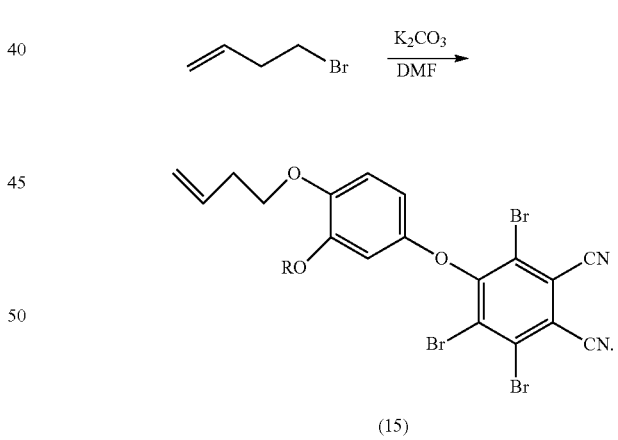

(3) Preparation of a phthalocyanine dye: Under N$_2$ environment, 4 mol of double bond-containing phthalocyanine precursor having a chemical structure represented by formula (15) and 0.5 mol of metal acetate were dissolved in 100 mL of high-boiling alcohol solvent, followed by heating for a reflux reaction for 7 days, wherein 1,8-diazabicyclo [5,4,0] dec-7-ene (DBU) was used as a reaction catalyst, and the reaction was completed and cooled to room temperature and purified by column chromatography with dichloromethane/chloroform as a eluent, to obtain the phthalocyanine dye having a chemical structure represented by formula (16).

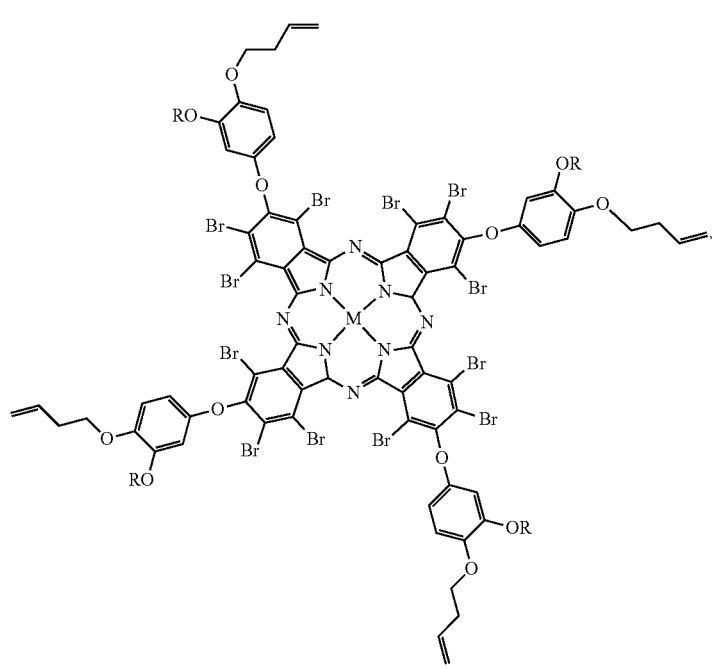

(16)

A reaction scheme of the preparation of phthalocyanine dyes is as follows:

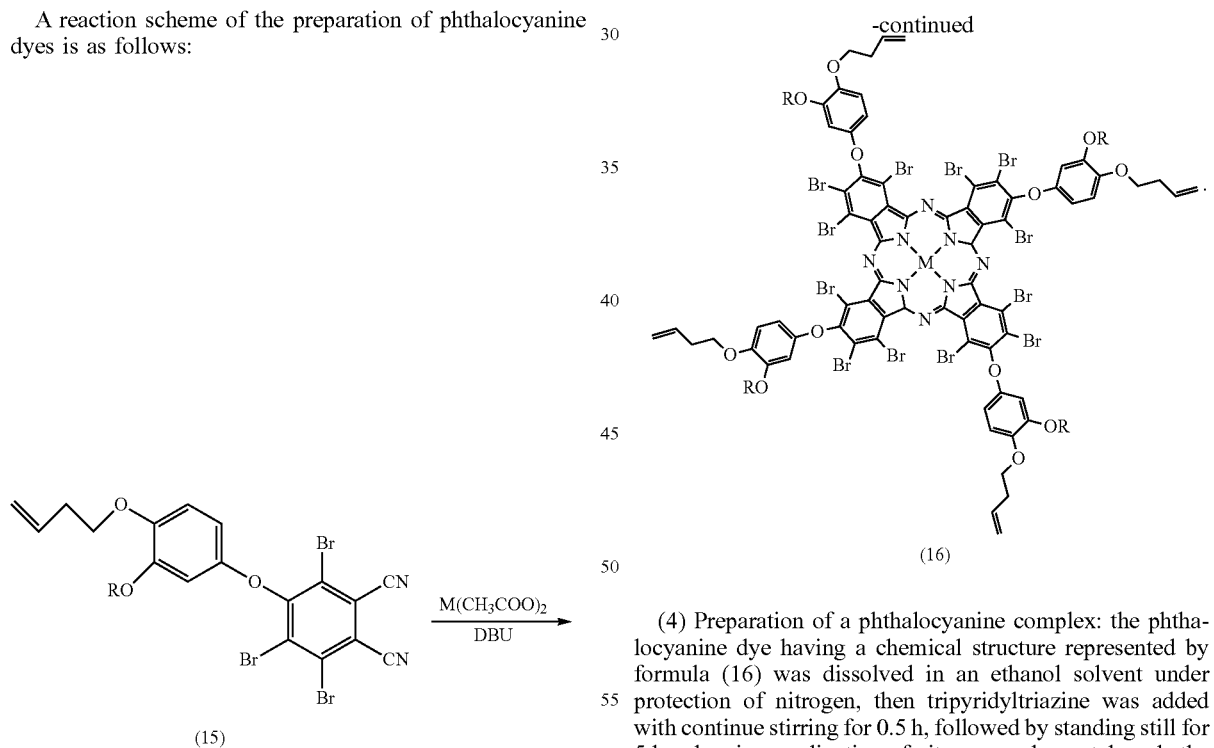

(4) Preparation of a phthalocyanine complex: the phthalocyanine dye having a chemical structure represented by formula (16) was dissolved in an ethanol solvent under protection of nitrogen, then tripyridyltriazine was added with continue stirring for 0.5 h, followed by standing still for 5 h, wherein coordination of nitrogen and a metal made the phthalocyanine dyes existing in the solution in a form of a trimer. Due to the steric hindrance of R, the phthalocyanine dyes will not further aggregate with each other. The phthalocyanine complex having a chemical structure represented by Formula (17) is filtered and obtained.

(17)
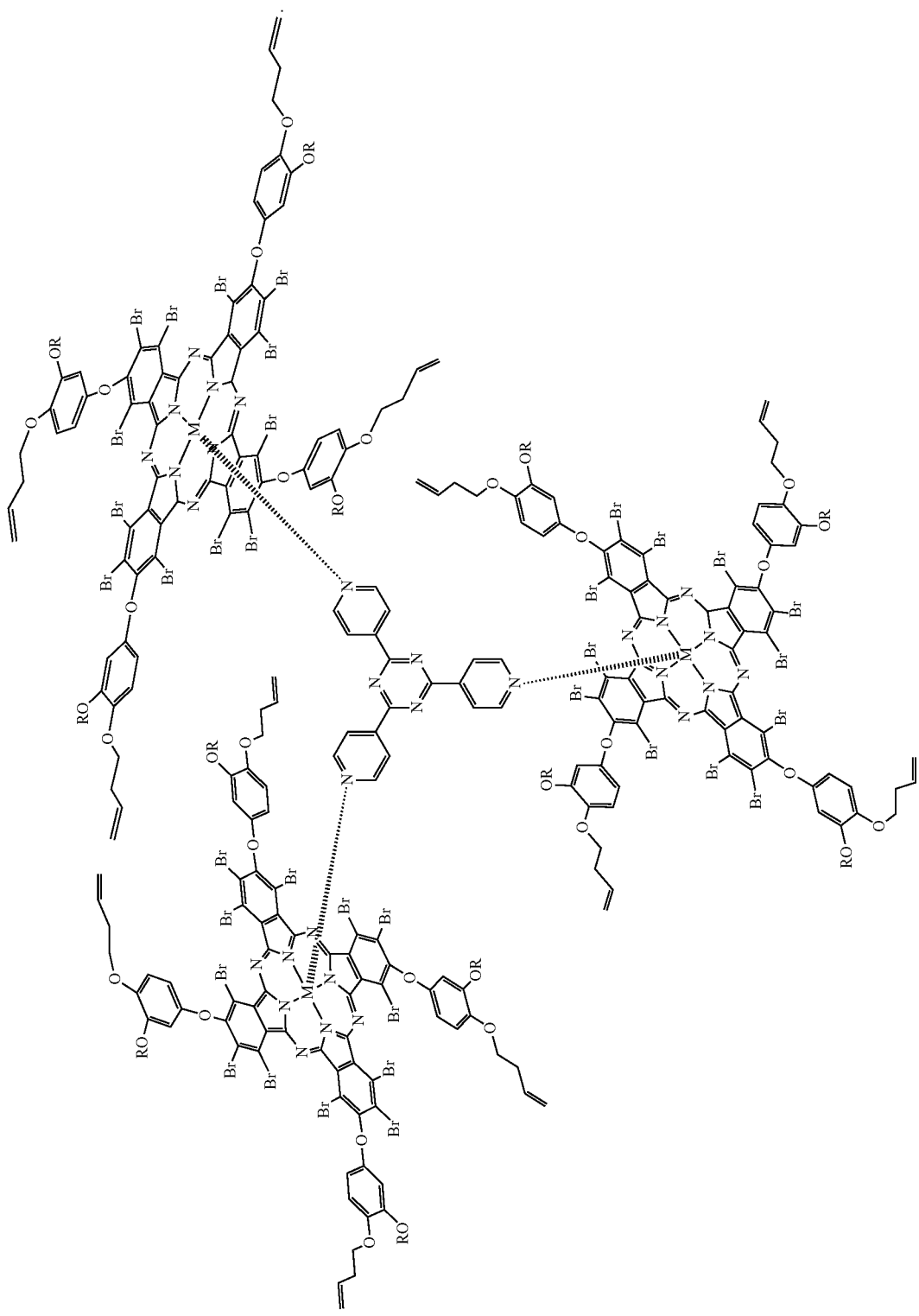

A reaction scheme of the preparation of the phthalocyanine complex is as follows:
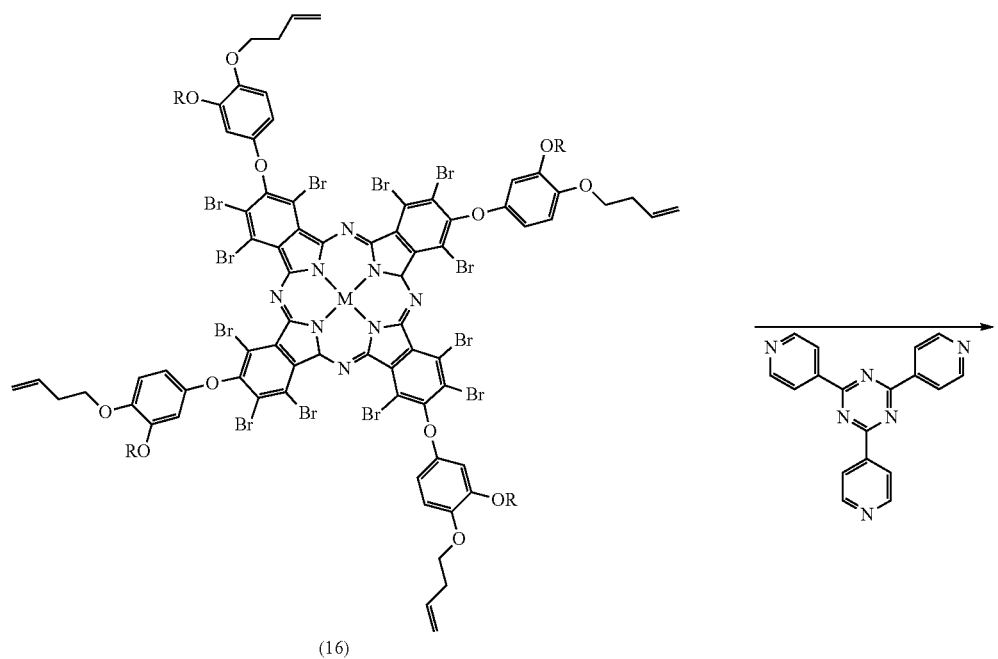
(16)
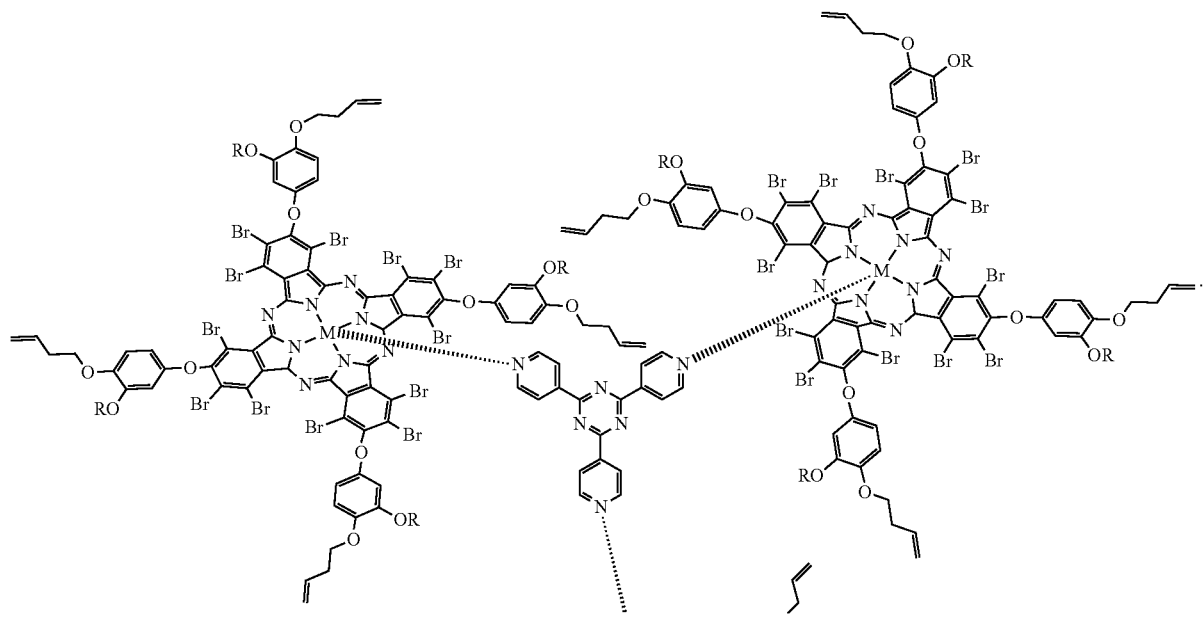

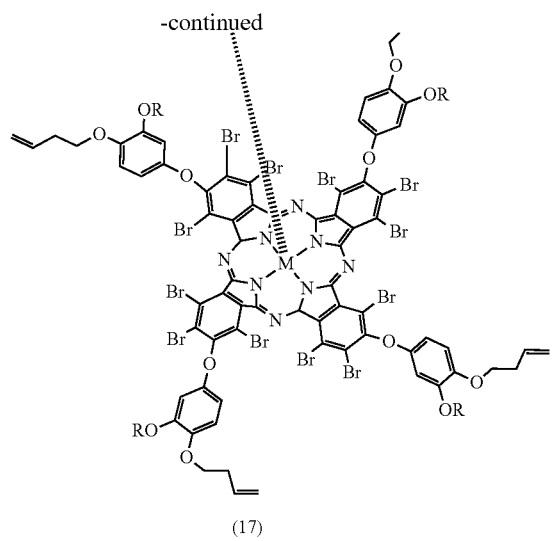

(17)

(5) Preparation of a phthalocyanine trimer: the phthalocyanine complex (0.5 mmol) having a chemical structure represented by formula (17) was dissolved in a methylene chloride solvent (100 mL) at room temperature under argon atmosphere, and Grubbs' II catalyst (40.0 μmol) was quickly added. After 12 hours of reaction, Grubbs' II catalyst (40.0 μmol) was added again to continue the reaction for 48 hours. After the reaction was completed, water was added to quench the reaction, to form a layered solution, wherein the organic layer was extracted and vortexed, followed by column chromatography with chloroform/methanol as an eluent to obtain the phthalocyanine trimer having a chemical structure represented by Formula (18).

(18)
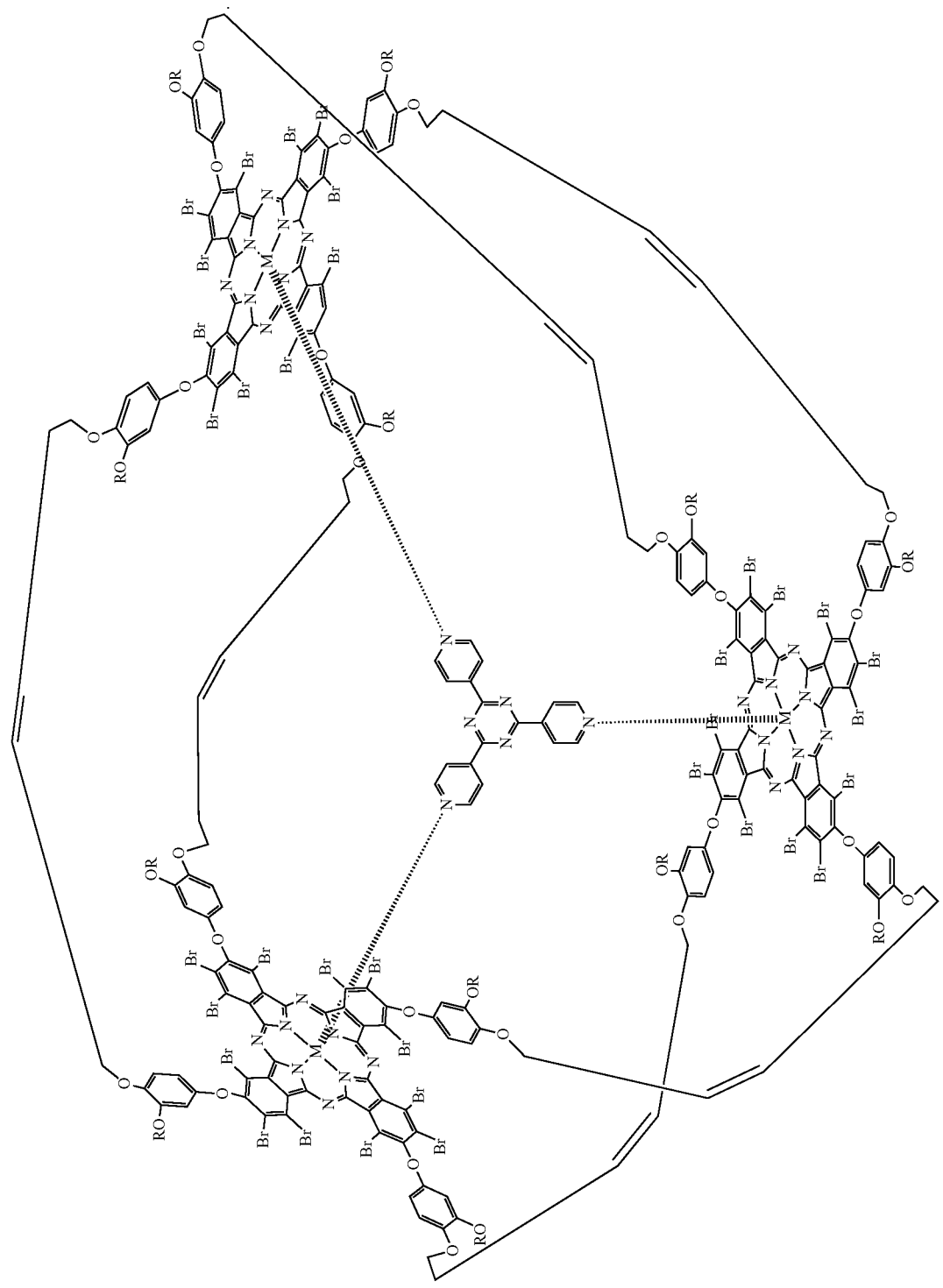

A reaction scheme of the preparation of phthalocyanine trimer is as follows:
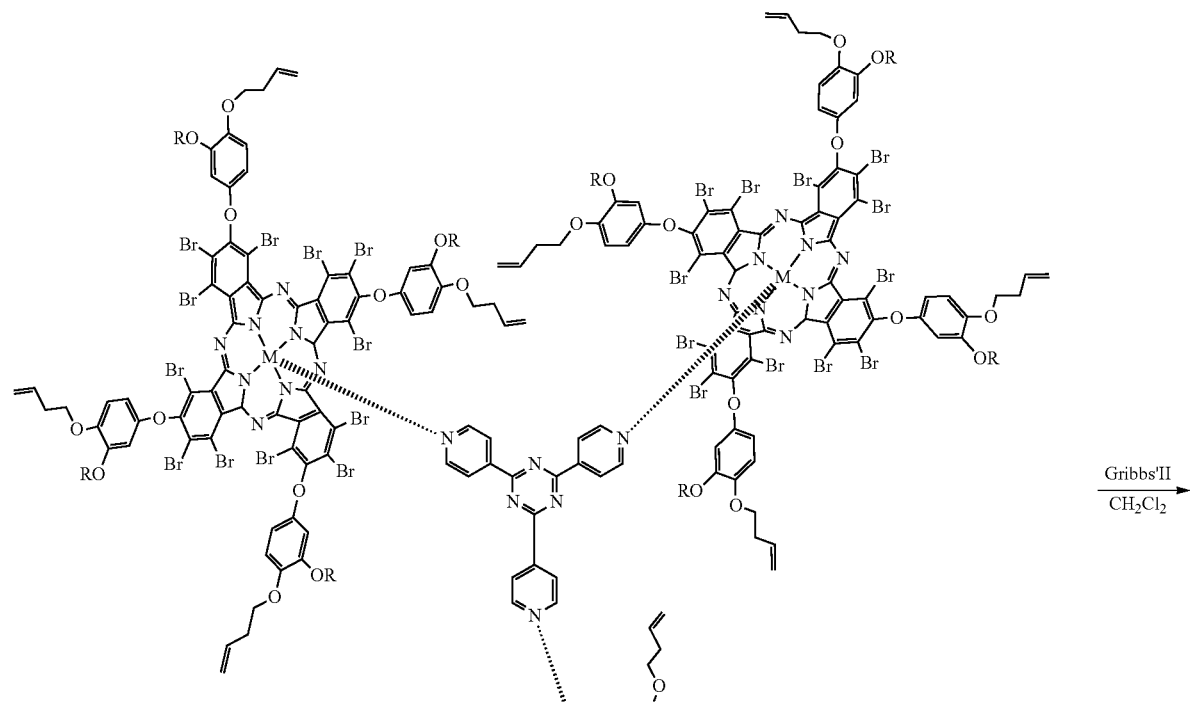
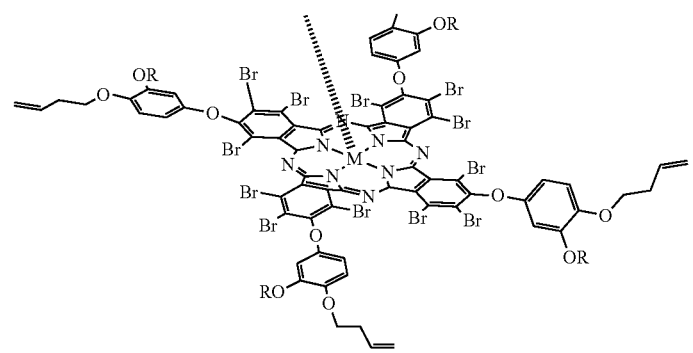
(17)

-continued

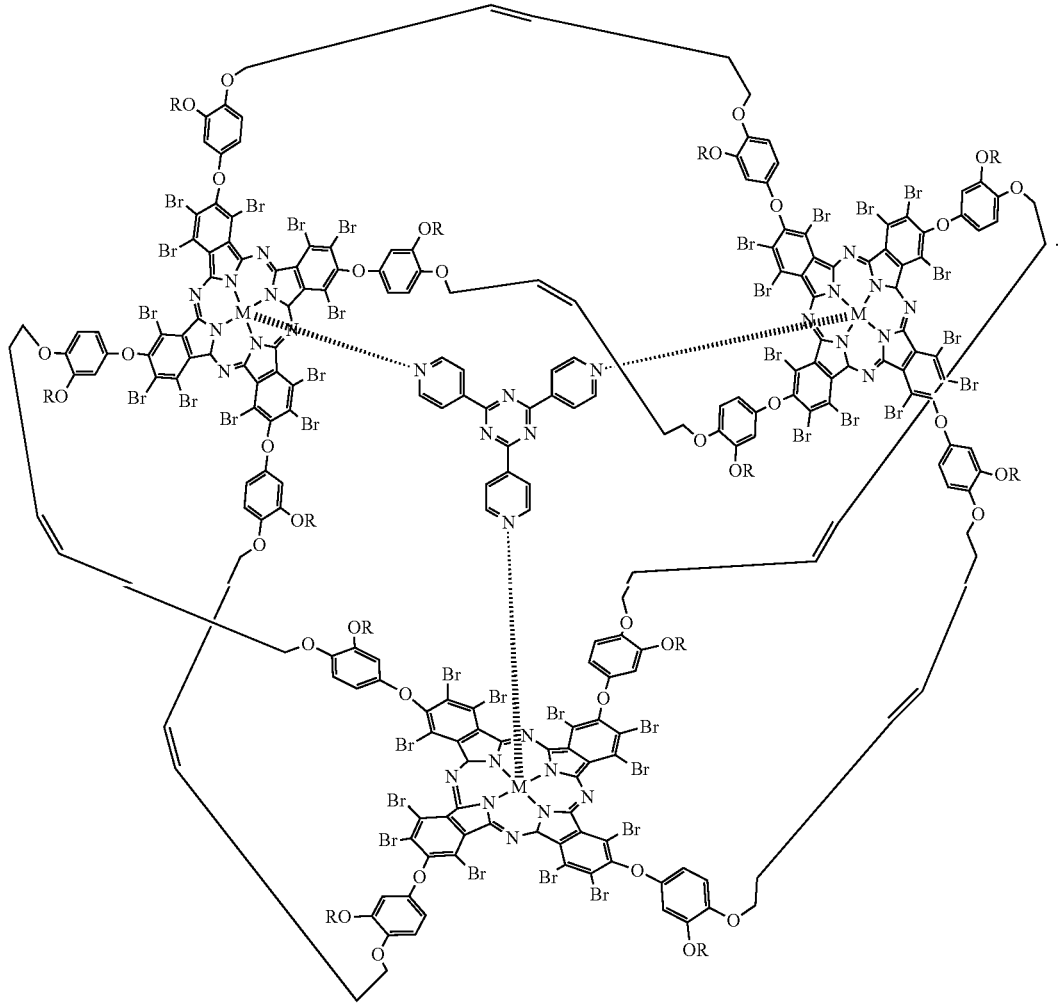

(18)

(6) Elution of guest molecules: the phthalocyanine trimer having a chemical structure represented by formula (18) was dissolved in a tetrahydrofuran solvent, and trifluoroacetic acid aqueous solution was added thereto, followed by gently stirring for 1 h to destroy the coordination force between nitrogen and metal, and standing still for 2 h. After that, separation and extraction were performed with chloroform solvent, to remove the guest molecules (tripyridyltriazine), and then the organic layer solution was dried to obtain the color resist material having a chemical structure represented by Formula (19),

(19)
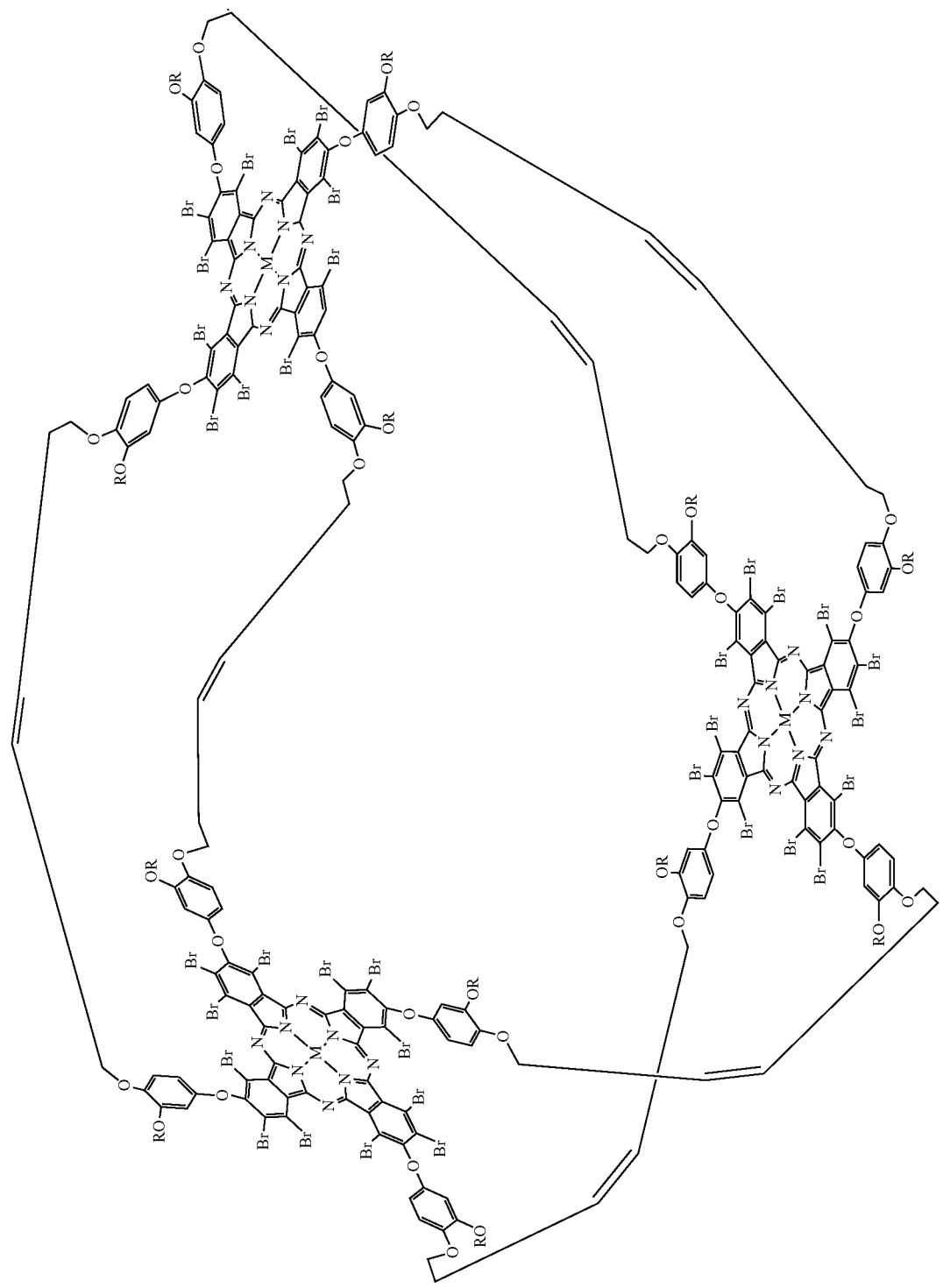

In another exemplary embodiment of the present application, there is also provided a filter, which combines and mixes the above-mentioned dye molecule, binder resin, photoinitiator, polymerizable monomer, thermal polymerization inhibitor, foam inhibitor, and leveling agent with a solvent to prepare a photoresist. The solvent may include propylene glycol methyl ether acetate (PGMEA), the binder resin may include acrylic resin, the photoinitiator may include a benzophenone compound, and the polymerizable monomer may include acrylic ester of hydroxy alcohol. A dispersant includes a polystyrene-polyacrylic acid diblock copolymer (PS-PAA). The color film filter is prepared by a conventional method, and the preparation steps are not repeated herein for brevity. The obtained filter has high transmittance and good optical properties.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A color resist material, having a chemical structure represented by Formula (1):

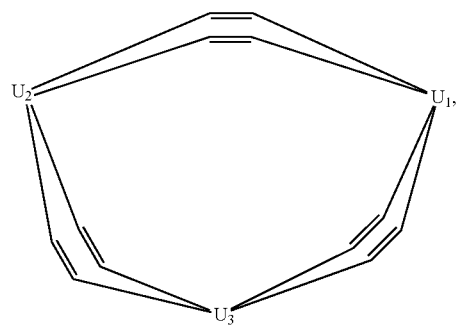

(1)

wherein each of chemical structures $U_1$, $U_2$ and $U_3$ is represented by Formula (1-2):

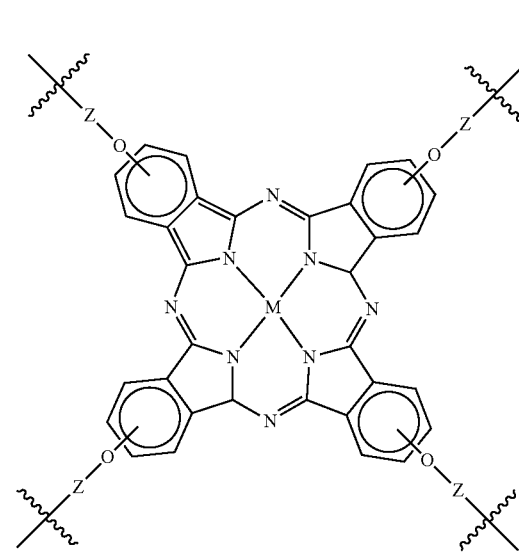

(1-2)

wherein Z has an end connected to oxygen and another end connected to a double bond in Formula (1), Z is selected from alkylene and —YOX—, where X is selected from alkylene, and Y is selected from arylene, and wherein in Formula (1), a benzene ring is also connected with other functional groups, each of the other functional groups is independently selected from one of hydrogen, halogen, alkyl, alkoxy, aryl, aryloxy, and a heterocyclic group, and M represents a metal or a metal halide.

2. The color resist material according to claim 1, wherein $U_1$ has a chemical structure represented by Formula (2) or (3), $U_2$ has a chemical structure represented by Formula (4) or (5), and $U_3$ has a chemical structure represented by Formula (6) or (7):

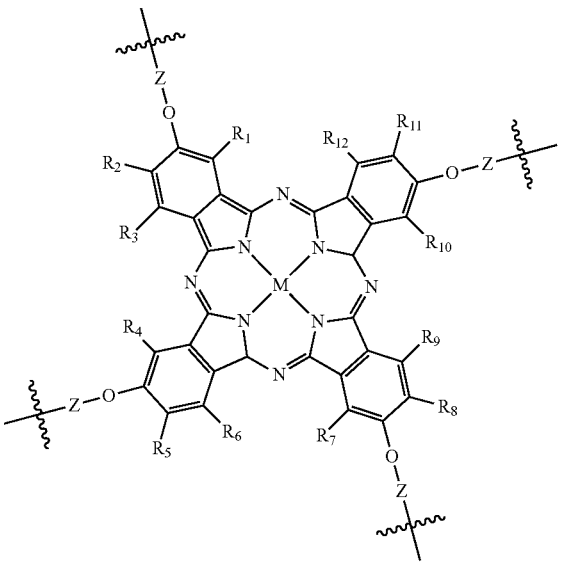

(2)

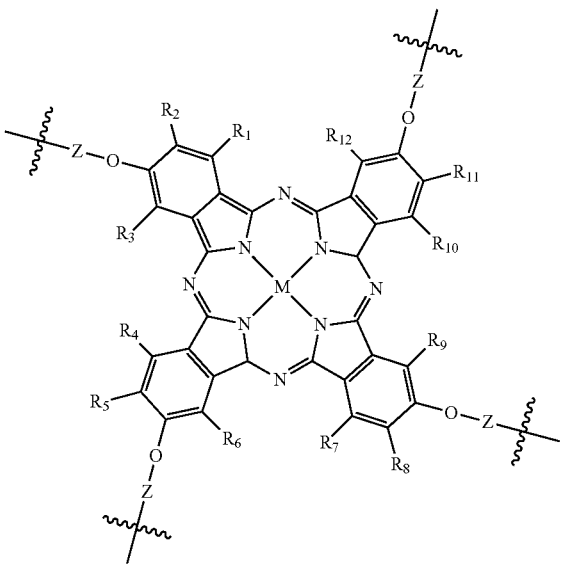

(3)

-continued (4)
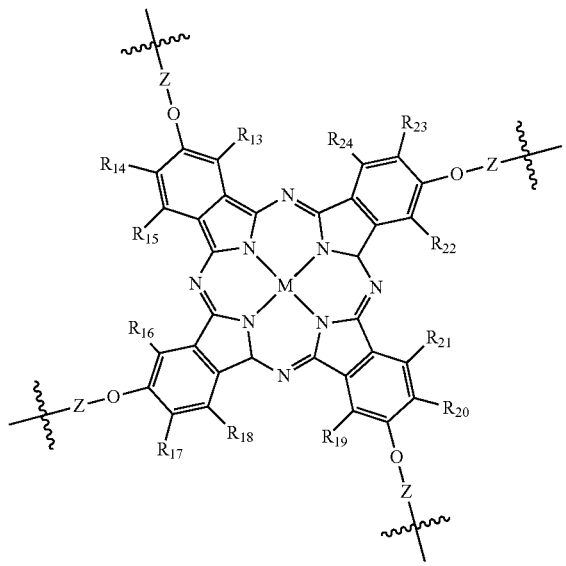

(5)
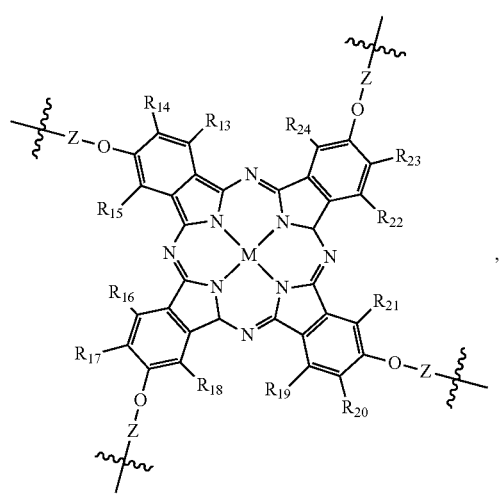

(6)
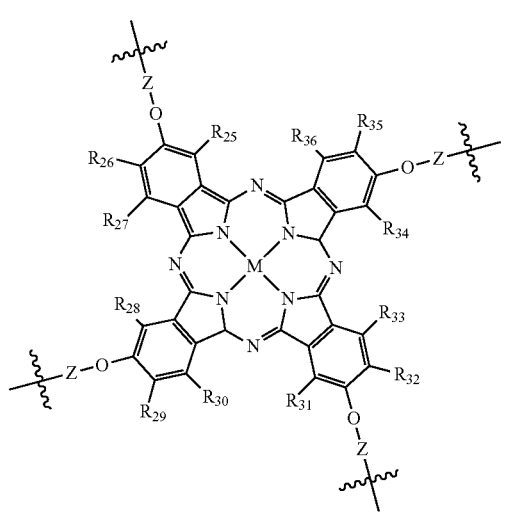

-continued (7)
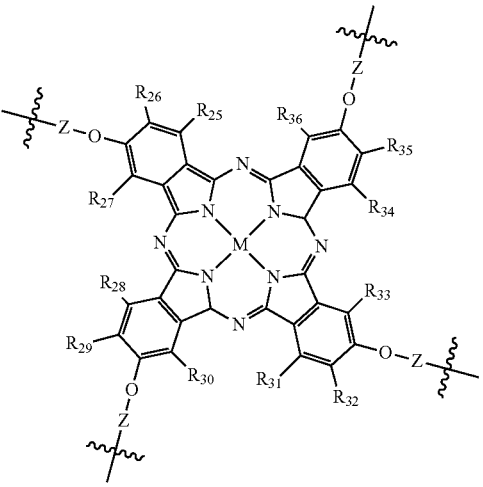

wherein each of $R_1$ to $R_{36}$ is independently selected from one of hydrogen, halogen, alkyl, alkoxy, aryl, aryloxy, and a heterocyclic group.

3. The color resist material according to claim 1, wherein Z is selected from one of alkylene having 2 to 8 carbons and —YOX—, where X is selected from alkylene having 1 to 3 carbons, and Y is selected from arylene having 12 to 24 carbons.

4. The color resist material according to claim 1, wherein the arylene is a substituted or unsubstituted phenylene, naphthylene, or biphenylene.

5. The color resist material according to claim 1, wherein the arylene contains —O—R as a substituent, and R is selected from one of the following groups:

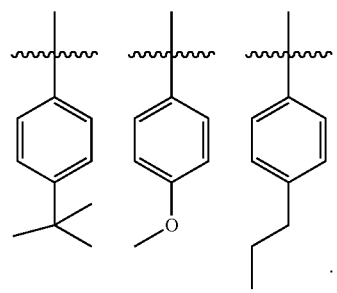

6. The color resist material according to claim 1, wherein each of the other functional groups is independently selected from one of halogen, alkyl having 1 to 8 carbons, alkoxy having 1 to 8 carbons, aryl having 6 to 12 carbons, aryloxy having 6 to 12 carbons, and a heterocyclic group having 3 to 12 carbons.

7. The color resist material according to claim 2, wherein at least four of $R_1$, $R_3$, $R_4$, $R_6$, $R_7$, $R_9$, $R_{10}$, $R_{12}$, at least four of $R_{13}$, $R_{15}$, $R_{16}$, $R_{18}$, $R_{19}$, $R_{21}$, $R_{22}$, $R_{24}$, and at least four of $R_{25}$, $R_{27}$, $R_{28}$, $R_{30}$, $R_{31}$, $R_{33}$, $R_{34}$, $R_{36}$ are selected from halogen, alkyl having 1 to 8 carbons, alkoxy having 1 to 8 carbons, aryl having 6 to 12 carbons, aryloxy having 6 to 12 carbons, and a heterocyclic group having 3 to 12 carbons.

8. A filter, comprising the color resist material according to claim 1.

9. The filter according to claim 8, wherein $U_1$ has a chemical structure represented by Formula (2) or (3), $U_2$ has a chemical structure represented by Formula (4) or (5), and U₃ has a chemical structure represented by Formula (6) or (7):
(2)
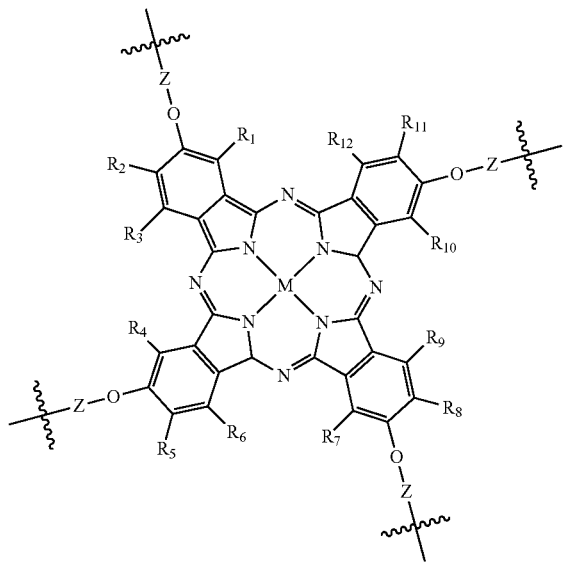
(3)
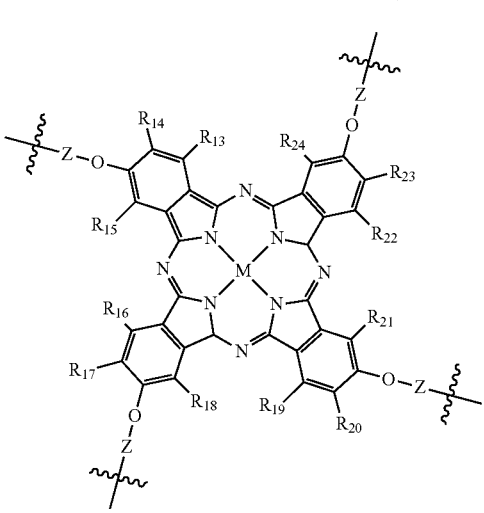
(4)
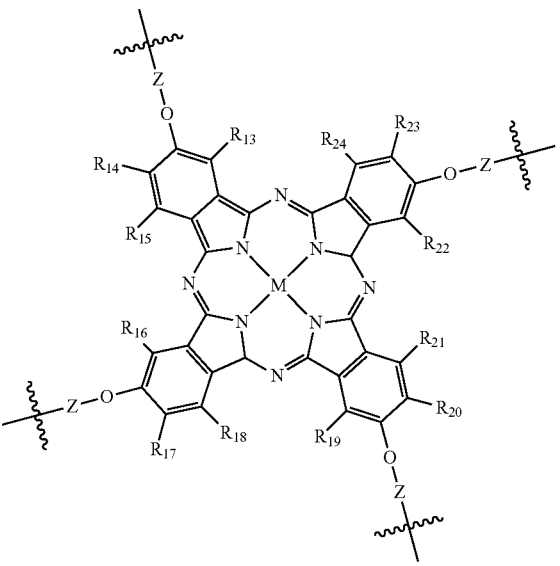
(5)
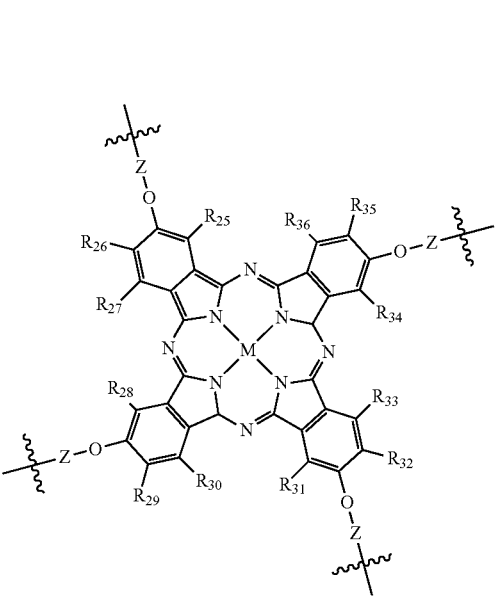
(6)

(7)

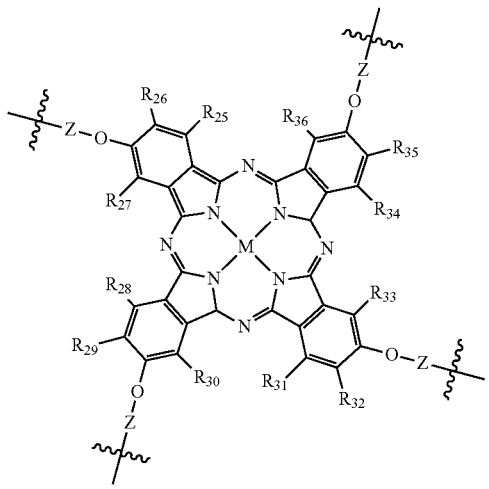

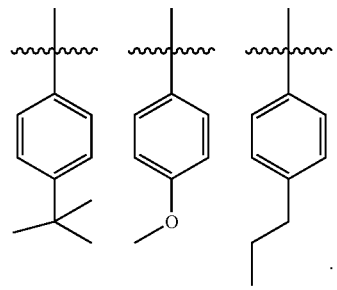

wherein each of $R_1$ to $R_{36}$ is independently selected from one of hydrogen, halogen, alkyl, alkoxy, aryl, aryloxy, and a heterocyclic group.

10. The filter according to claim 8, wherein Z is selected from one of alkylene having 2 to 8 carbons and —YOX—, where X is selected from alkylene having 1 to 3 carbons, and Y is selected from arylene having 12 to 24 carbons.

11. The filter according to claim 8, wherein the arylene is a substituted or unsubstituted phenylene, naphthylene, or biphenylene.

12. The filter according to claim 8, wherein the arylene contains —O—R as a substituent, and R is selected from one of the following groups:

13. A method of preparing a color resist material, which comprises the following steps:

dissolving a phthalocyanine dye represented by one of Formula (8), Formula (9), and Formula (10) in a first solvent;

adding tripyridyltriazine to the first solvent, followed by stirring and then standing still to obtain a phthalocyanine complex having a chemical structure of Formula (11);

dissolving the phthalocyanine complex in a second solvent, and adding a catalyst to the second solvent for reaction;

performing quenching, extraction, and separation and purification by column chromatography, to obtain a phthalocyanine trimer of chemical structure (12); and eluting the phthalocyanine trimer to obtain the color resist material having a chemical structure represented by Formula (1):

(8)

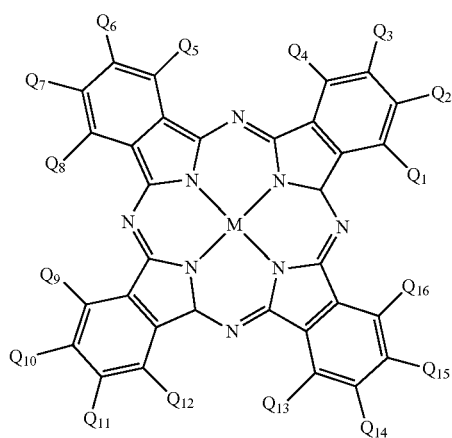

(9)

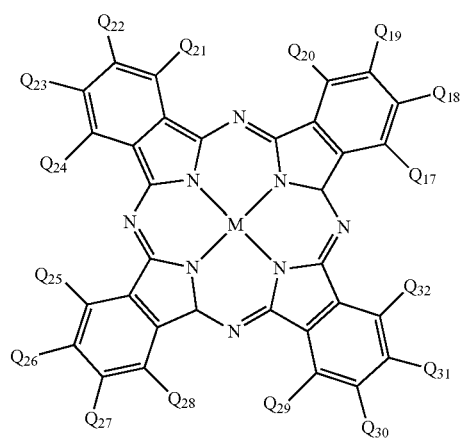

(10)
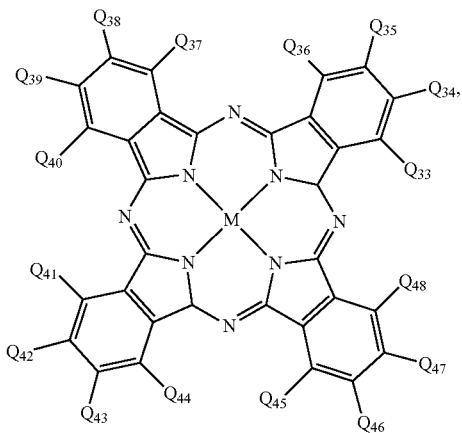
(11)
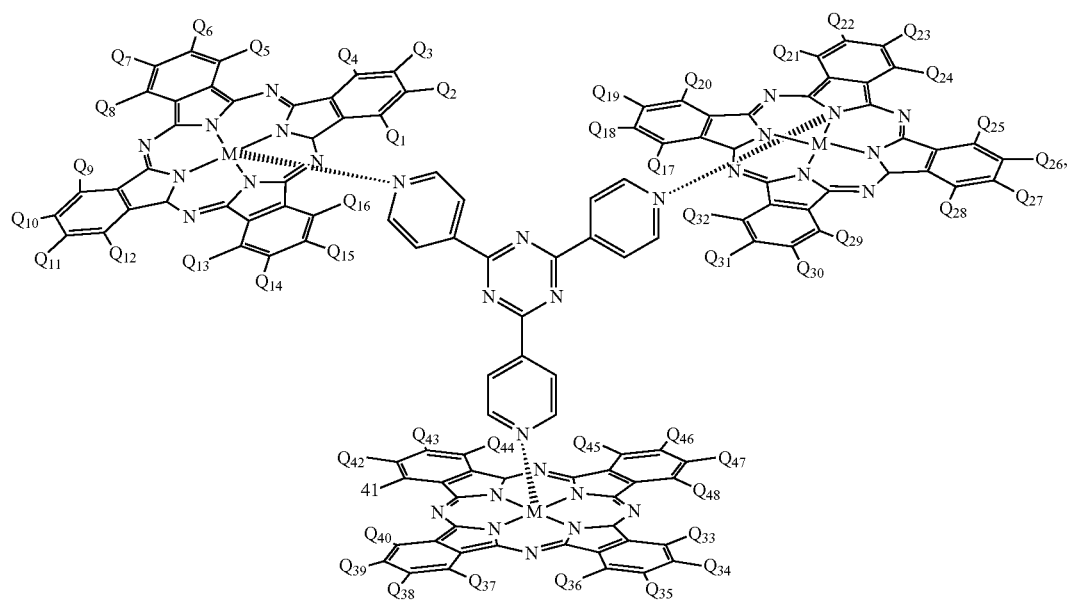
(12)
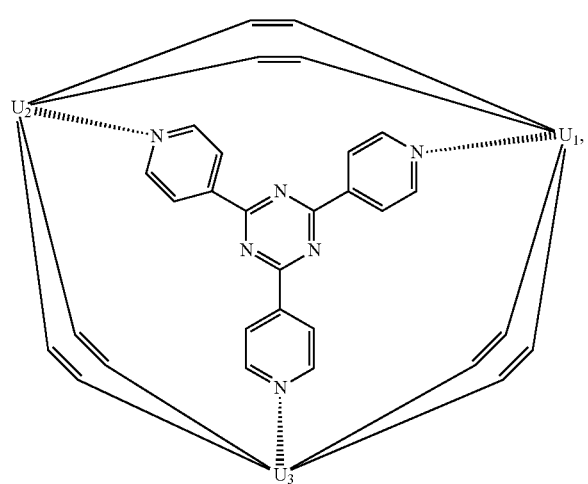
(1)
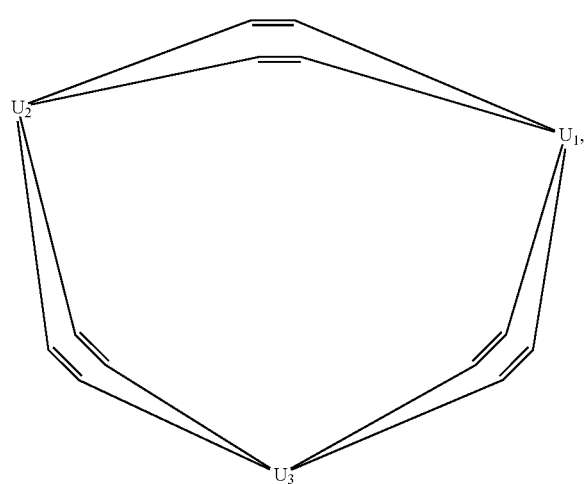

wherein each of chemical structures $U_1$, $U_2$ and $U_3$ is represented by Formula (1-2):

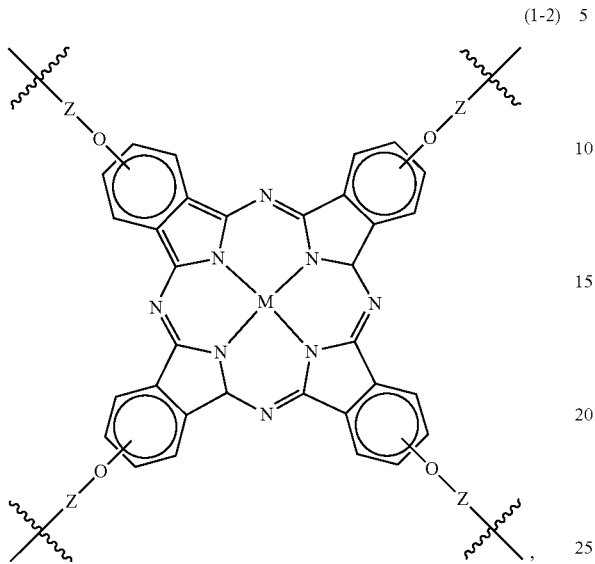

(1-2)

wherein Z has an end connected to oxygen and another end connected to a double bond in Formula (1), Z is selected from alkylene and —YOX—, where X is selected from alkylene, and Y is selected from arylene, wherein in Formula (1), a benzene ring is also connected with other functional groups, each of the other functional groups is independently selected from one of hydrogen, halogen, alkyl, alkoxy, aryl, aryloxy, and a heterocyclic group, and M represents a metal or a metal halide;

wherein one of $Q_1$ to $Q_4$, one of $Q_5$ to $Q_8$, one of $Q_9$ to $Q_{12}$, one of $Q_{13}$ to $Q_{16}$, one of $Q_{17}$ to $Q_{20}$, one of $Q_{21}$ to $Q_{24}$, one of $Q_{25}$ to $Q_{28}$, one of $Q_{29}$ to $Q_{32}$, one of $Q_{33}$ to $Q_{36}$, one of $Q_{37}$ to $Q_{40}$, one of $Q_{41}$ to $Q_{44}$, and one of $Q_{45}$ to $Q_{48}$ are selected from —O—Z—CH=$CH_2$, where Z is selected from one of alkylene and —YOX—, in which X is selected from alkylene, and Y is selected from arylene; each functional group $Q_1$ to $Q_{48}$ is independently selected from one of hydrogen, halogen, alkyl, alkoxy, aryl, aryloxy, and a heterocyclic group; and wherein M is selected from a metal or a metal halide.

14. The preparation method according to claim 13, further comprising a step of preparing the phthalocyanine dye represented by one of Formula (8), Formula (9), and Formula (10).

15. The preparation method according to claim 13, wherein one of $Q_2$ and $Q_3$, one of $Q_6$ and $Q_7$, one of $Q_{10}$ and $Q_{11}$, one of $Q_{14}$ and $Q_{15}$, one of $Q_{18}$ and $Q_{19}$, one of $Q_{22}$ and $Q_{23}$, one of $Q_{26}$ and $Q_{27}$, one of $Q_{30}$ and $Q_{31}$, one of $Q_{34}$ and $Q_{35}$, one of $Q_{38}$ and $Q_{39}$, one of $Q_{42}$ and $Q_{43}$, and one of $Q_{46}$ and $Q_{47}$ are selected from —O—Z—CH=$CH_2$.

16. The preparation method according to claim 13, wherein Z is selected from alkylenes having 2 to 8 carbons and —YOX—, where X is selected from alkylene having 1 to 3 carbons, and Y is selected from arylene having 12 to 24 carbons.

17. The preparation method according to claim 13, wherein the arylene is a substituted or unsubstituted phenylene, naphthylene, or biphenylene.

18. The preparation method according to claim 13, wherein the arylene contains —O—R as a substituent, and R is selected from one of the following groups:

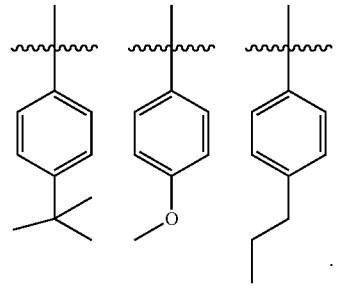

19. The preparation method according to claim 13, wherein each of the other functional groups is independently selected from one of halogen, alkyl having 1 to 8 carbons, alkoxy having 1 to 8 carbons, aryl having 6 to 12 carbons, aryloxy having 6 to 12 carbons, and a heterocyclic group having 3 to 12 carbons.

20. The preparation method according to claim 13, wherein at least four of $Q_1$, $Q_4$, $Q_5$, $Q_8$, $Q_9$, $Q_{12}$, $Q_{13}$, $Q_{16}$, at least four of $Q_{17}$, $Q_{20}$, $Q_{21}$, $Q_{24}$, $Q_{25}$, $Q_{28}$, $Q_{29}$, $Q_{32}$, and at least four of $Q_{33}$, $Q_{36}$, $Q_{37}$, $Q_{40}$, $Q_{41}$, $Q_{44}$, $Q_{45}$, $Q_{48}$ are selected from halogen, alkyl having 1 to 8 carbons, alkoxy having 1 to 8 carbons, aryl having 6 to 12 carbons, aryloxy having 6 to 12 carbons, and a heterocyclic group having 3 to 12 carbons.

* * * * *